United States Patent
Sundararajan et al.

(10) Patent No.: US 12,146,432 B2
(45) Date of Patent: Nov. 19, 2024

(54) SYSTEMS AND METHODS FOR SENSOR TAMPERING DETECTION

(71) Applicant: Cummins Emission Solutions Inc., Columbus, IN (US)

(72) Inventors: Vikram Sundararajan, Columbus, IN (US); Jinqian Gong, Columbus, IN (US); Kerang Wang, Columbus, IN (US); Randal D. Watts, Hartsville, IN (US); Daniel D. Wilhelm, Sanibel, FL (US)

(73) Assignee: Cummins Emission Solutions Inc., Columbus, IN (US)

( * ) Notice: Subject to any disclaimer, the term of this patent is extended or adjusted under 35 U.S.C. 154(b) by 162 days.

(21) Appl. No.: 18/145,649

(22) Filed: Dec. 22, 2022

(65) Prior Publication Data

US 2024/0209762 A1   Jun. 27, 2024

(51) Int. Cl.
*F01N 3/20* (2006.01)
*F01N 11/00* (2006.01)

(52) U.S. Cl.
CPC .............. *F01N 3/208* (2013.01); *F01N 11/00* (2013.01); *F01N 2550/02* (2013.01); *F01N 2560/026* (2013.01); *F01N 2560/14* (2013.01); *F01N 2900/0416* (2013.01)

(58) Field of Classification Search
CPC ...... F01N 3/208; F01N 11/00; F01N 2550/02; F01N 2560/026; F01N 2560/14; F01N 2900/0416; F01N 3/2066; F01N 2610/02; F01N 9/00; F01N 13/0093; Y02T 10/12
See application file for complete search history.

(56) References Cited

U.S. PATENT DOCUMENTS

| | | | |
|---|---|---|---|
| 8,307,699 B2 | 11/2012 | Sawada et al. | |
| 9,109,493 B2 | 8/2015 | Lin et al. | |
| 9,664,091 B2 | 5/2017 | Lundström et al. | |
| 10,077,700 B2 | 9/2018 | Nagel et al. | |
| 10,156,176 B2 | 12/2018 | Osburn et al. | |
| 10,508,582 B2 | 12/2019 | Hall et al. | |
| 11,174,810 B2 * | 11/2021 | Sommansson | F01N 3/108 |
| 2020/0370454 A1 | 11/2020 | Gupta et al. | |
| 2021/0033041 A1 | 2/2021 | Sommansson et al. | |
| 2022/0025802 A1 | 1/2022 | Webb et al. | |

* cited by examiner

*Primary Examiner* — Brandon D Lee
(74) *Attorney, Agent, or Firm* — Foley & Lardner LLP

(57) ABSTRACT

A system, method, and apparatus for sensor tampering detection are provided. An aftertreatment system comprises a first leg comprising a first Selective Catalytic Reduction (SCR) system, a first doser, and a first NOx sensor, a second leg comprising a second SCR system, a second doser, and a second NOx sensor, and a controller. The controller determines satisfaction of enabling conditions. The controller doses reductant to the first and second SCR systems. The controller determines NOx values of the first SCR system and the second SCR system. The controller adjust the dosing of the first SCR system for a time period. The controller measures NOx values of the first SCR system and the second SCR system. The controller determines a difference between the third and first NOx values and a difference between the fourth and second NOx values. The controller generates an indication regarding whether the first NOx sensor is displaced.

20 Claims, 10 Drawing Sheets

SYSTEMS AND METHODS FOR SENSOR TAMPERING DETECTION

TECHNICAL FIELD

The present application relates generally to an aftertreatment system, and particularly for detecting sensor tampering in the aftertreatment system.

BACKGROUND

Internal combustion engines, such as diesel engines, emit exhaust that includes nitrogen oxide ($NO_x$) compounds. It is desirable to reduce $NO_x$ emissions, for example, to comply with environmental regulations. To reduce $NO_x$ emissions, a reductant may be dosed into the exhaust by a dosing system in an aftertreatment system. The reductant cooperates with a catalyst of a catalyst member to facilitate conversion of a portion of the exhaust into non-$NO_x$ emissions, such as nitrogen ($N_2$), carbon dioxide ($CO_2$), and water ($H_2O$), thereby reducing $NO_x$ emissions. In some applications, compounds of the exhaust can also be filtered or removed by one or more catalyst members (e.g., a diesel oxidation catalyst (DOC) member, a select catalytic reduction (SCR) catalyst member, diesel particulate filter (DPF) member, an ammonia oxidation (AMOx) catalyst member, etc.) located in an aftertreatment system.

SUMMARY

Certain aftertreatment systems can include multiple legs for reducing exhaust by-products of exhaust gas generated from an internal combustion engine. Each leg within the aftertreatment system has one or more components for reducing the exhaust byproducts, such as catalyst members (e.g., SCR catalyst members, DOC members, etc.), filters (such as DPF members). Each leg can include various sensors, such as $NO_x$ sensor configured to sense $NO_x$ at various locations of the aftertreatment system. For instance, the $NO_x$ sensor positioned downstream from the SCR catalyst member is used to measure $NO_x$ values (e.g., amount of $NO_x$) downstream from the SCR catalyst member (or the SCR system). The $NO_x$ values can be used for adjusting or calibrating reductant dosage in the SCR system.

However, some users may tamper with the aftertreatment system by, for example, moving the $NO_x$ sensor from one leg to another. It may be challenging to detect such sensor tampering during the aftertreatment system operation (e.g., outside of servicing or maintenance), potentially leading to inaccurate reductant dosage and/or $NO_x$ slip at the tailpipe. The systems, methods, and apparatuses described herein allow for detection of sensor tampering, such as displacement/misplacement of the sensor (e.g., $NO_x$ sensor). The systems and methods of the technical solution are configured to override an ammonia-to-$NO_x$ ratio (ANR) (e.g., an amount of ammonia relative to an amount of $NO_x$) to identify whether the sensors are measuring data as expected according to changes (or no changes) to the $NO_x$ measurements. Hence, by detecting the displacement of the sensor within the aftertreatment system, the systems and methods can notify the operator to perform maintenance on the aftertreatment system or visit a service center, such that potential $NO_x$ slip can be minimized and so that the aftertreatment system can be made to comply with the environmental regulations.

In some embodiments, an aftertreatment system comprises a first leg comprising a first Selective Catalytic Reduction (SCR) system and a first doser. The aftertreatment system comprises a second leg comprising a second SCR system and a second doser. The aftertreatment system comprises a controller. The controller is configured to determine satisfaction of one or more enabling conditions. In response to the satisfaction of the one or more enabling conditions, the controller is configured to dose reductant to the first SCR system using the first doser and to the second SCR system using the second doser. The controller is configured to determine, in response to the dosing, a first NOx value of the first SCR system based on a reading from a first NOx sensor associated with the first leg, and a second NOx value of the second SCR system based on a reading from a second NOx sensor associated with the second leg. The controller is configured to adjust the dosing of the first SCR system for a first time period in response to the first NOx value and the second NOx value reaching a first predetermined threshold. At the end of a second time period after adjusting the dosing of the first SCR system, the controller is configured to measure a third NOx value of the first SCR system based on the reading from the first NOx sensor, and measure a fourth NOx value of the second SCR system based on the reading from the second NOx sensor. The controller is configured to determine a first difference between the third NOx value and the first NOx value. The controller is configured to determine a second difference between the fourth NOx value and the second NOx value. The controller is configured to generate an indication regarding whether the second NOx sensor is displaced based on the first difference and the second difference.

In some embodiments, the controller is configured to determine that the first NOx sensor and the second NOx sensor are not displaced in response to the first difference being greater than a second predetermined threshold and the second difference being less than the second predetermined threshold. In some embodiments, the controller is configured to determine that the first NOx sensor and the second NOx sensor are not displaced in response to determining that a difference between the second difference and the first difference is greater than a second predetermined threshold.

In some embodiments, the controller is configured to determine that the second NOx sensor is displaced in response to determining that the first difference is greater than a second predetermined threshold and a difference between the second difference and the first difference is less than a third predetermined threshold. In some embodiments, the one or more enabling conditions are satisfied in response to a bed temperature of each of the first SCR system and the second SCR system being greater than a second predetermined threshold.

In some embodiments, the one or more enabling conditions are satisfied in response to a engine out NOx value of each of the first leg and the second leg being greater than a second predetermined threshold. In some embodiments, the first time period is based on a time required for the first NOx value to change by a predetermined percentage.

In some embodiments, subsequent to determining that the first difference is greater than a second predetermined threshold and a difference between the second difference and the first difference is less than a third predetermined threshold, the controller is further configured to adjust the dosing of the first SCR system for a third time period greater than adjusting the dosing of the first SCR system for the first time period. At the end of a fourth time period after adjusting the dosing of the first SCR system for the third time period, the controller is configured to measure a fifth NOx value of the first SCR system based on the reading from the first NOx sensor, and measure a sixth NOx value of the second SCR system based on the reading from the second NOx sensor. The controller is configured to determine a third difference between the fifth NOx value and the first NOx value. The controller is configured to determine a fourth difference between the sixth NOx value and the second NOx value. The controller is configured to generate an indication regarding whether the second NOx sensor is displaced based on the third difference and the fourth difference.

In some embodiments, a method comprises determining, by a controller, satisfaction of one or more enabling conditions. In response to the satisfaction of the one or more enabling conditions, the method comprises dosing, by the controller, reductant to a first Selective Catalytic Reduction (SCR) system of a first leg using a first doser and to a second SCR system of a second leg using a second doser. The method comprises determining, by the controller in response to the dosing, a first NOx value of the first SCR system based on a reading from a first NOx sensor associated with the first leg, and a second NOx value of the second SCR system based on a reading from a second NOx sensor associated with the second leg. The method comprises adjusting, by the controller, the dosing of the first SCR system for a first time period in response to the first NOx value and the second NOx value reaching a first predetermined threshold. At the end of a second time period after adjusting the dosing of the first SCR system, the method comprises measuring, by the controller, a third NOx value of the first SCR system based on the reading from the first NOx sensor, and measure a fourth NOx value of the second SCR system based on the reading from the second NOx sensor. The method comprises determining, by the controller, a first difference between the third NOx value and the first NOx value. The method comprises determining, by the controller, a second difference between the fourth NOx value and the second NOx value. The method comprises generating, by the controller, an indication regarding whether the second NOx sensor is displaced based on the first difference and the second difference.

In some embodiments, the method comprises determining, by the controller, that the first NOx sensor and the second NOx sensor are not displaced in response to the first difference being greater than a second predetermined threshold and the second difference being less than the second predetermined threshold. In some embodiments, the method comprises determining, by the controller, that the first NOx sensor and the second NOx sensor are not displaced in response to determining that a difference between the second difference and the first difference is greater than a second predetermined threshold.

In some embodiments, the method comprises determining, by the controller, that the second NOx sensor is displaced in response to determining that the first difference is greater than a second predetermined threshold and a difference between the second difference and the first difference is less than a third predetermined threshold. In some embodiments, the one or more enabling conditions are satisfied in response to a bed temperature of each of the first SCR system and the second SCR system being greater than a second predetermined threshold.

In some embodiments, the one or more enabling conditions are satisfied in response to a engine out NOx value of each of the first leg and the second leg being greater than a second predetermined threshold. In some embodiments, the first time period is based on a time required for the first NOx value to change by a predetermined percentage.

In some embodiments, a controller comprises one or more processors. The controller comprises one or more memory devices coupled to the one or more processors, the one or more memory devices storing instructions that, when executed by the one or more processors, cause the one or more processors to: determine satisfaction of one or more enabling conditions; in response to the satisfaction of the one or more enabling conditions, dose reductant to a first Selective Catalytic Reduction (SCR) system of a first leg using a first doser and to a second SCR system of a second leg using a second doser; determine, in response to the dosing, a first NOx value of the first SCR system based on a reading from a first NOx sensor associated with the first leg, and a second NOx value of the second SCR system based on a reading from a second NOx sensor associated with the second leg; adjust the dosing of the first SCR system for a first time period in response to the first NOx value and the second NOx value reaching a first predetermined threshold; at the end of a second time period after adjusting the dosing of the first SCR system, measure a third NOx value of the first SCR system based on the reading from the first NOx sensor, and measure a fourth NOx value of the second SCR system based on the reading from the second NOx sensor; determine a first difference between the third NOx value and the first NOx value; determine a second difference between the fourth NOx value and the second NOx value; and generate an indication regarding whether the second NOx sensor is displaced based on the first difference and the second difference.

In some embodiments, the instructions, when executed by the one or more processors, cause the one or more processors to determine that the first NOx sensor and the second NOx sensor are not displaced in response to the first difference being greater than a second predetermined threshold and the second difference being less than the second predetermined threshold. In some embodiments, the instructions, when executed by the one or more processors, cause the one or more processors to determine that the first NOx sensor and the second NOx sensor are not displaced in response to determining that a difference between the second difference and the first difference is greater than a second predetermined threshold.

In some embodiments, the instructions, when executed by the one or more processors, cause the one or more processors to determine that the second NOx sensor is displaced in response to determining that the first difference is greater than a second predetermined threshold and a difference between the second difference and the first difference is less than a third predetermined threshold.

In some embodiments, the one or more enabling conditions are satisfied in response to a bed temperature of each of the first SCR system and the second SCR system being greater than a second predetermined threshold. In some embodiments, the one or more enabling conditions are satisfied in response to a engine out NOx value of each of the first leg and the second leg being greater than a second predetermined threshold.

BRIEF DESCRIPTION OF THE FIGURES

The details of one or more embodiments are set forth in the accompanying drawings and the description below. Other features, aspects, and advantages of the disclosure will become apparent from the description, the drawings, and the claims, in which:

Figure 1:
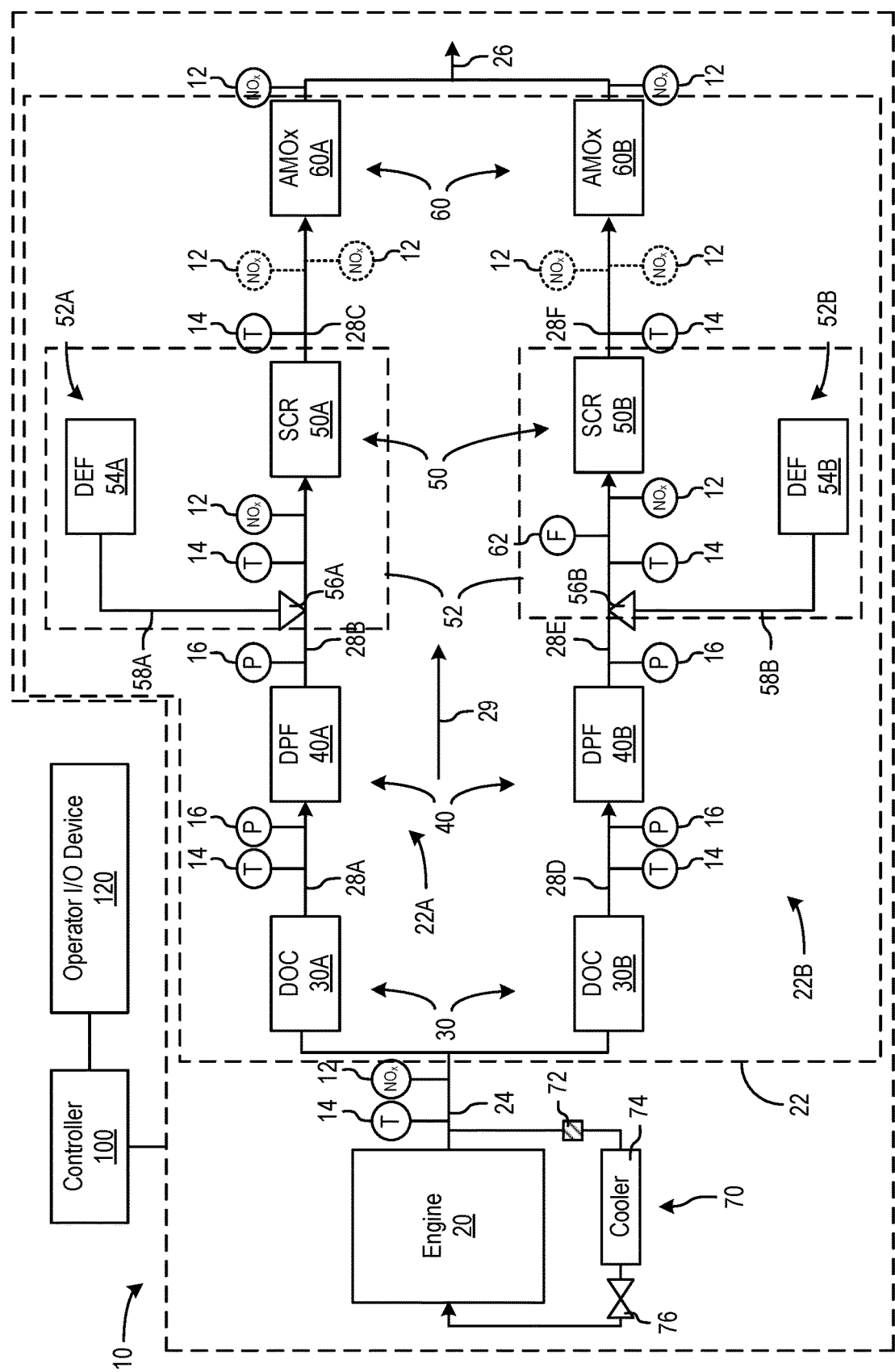
FIG. 1 is an example schematic diagram of an engine-exhaust aftertreatment system coupled to a controller.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Following below are more detailed descriptions of various concepts related to, and embodiments of, methods, apparatuses, and for detecting sensor tampering within an aftertreatment system. The various concepts introduced above and discussed in greater detail below may be implemented in any of a number of ways, as the described concepts are not limited to any particular manner of implementation. Examples of specific embodiments and applications are provided primarily for illustrative purposes.

I. Overview

Internal combustion engines (e.g., diesel internal combustion engines, etc.) produce exhaust (e.g., sometimes referred to as exhaust gas). Depending on the fuel consumed by an internal combustion engine, the exhaust can contain different byproducts (e.g., $NO_x$, carbon monoxide (CO), unburned hydrocarbons (HC), etc.). The byproduct of the exhaust can be measured or sensed by one or more sensors of an aftertreatment system, for instance, measuring the density, volume, parts per million (ppm), etc. of the exhaust. The aftertreatment system may be coupled to the engine, such as connected via an exhaust pipe from the engine. For simplicity, the examples herein can provide $NO_x$ as the byproducts of the exhaust and the sensor can be a $NO_x$ sensor structured to sense $NO_x$ emission downstream of the engine (e.g., at any position along the exhaust pipe). Although the described examples include a $NO_x$ sensor measuring a $NO_x$ byproduct, the described systems can be applied to other sensors.

The byproducts of the exhaust can be reduced by one or more aftertreatment components of an engine system including an aftertreatment system, such as a DOC member or a SCR catalyst member, among other types of catalysts. The aftertreatment system can include multiple legs. For simplicity, the examples herein provide the aftertreatment system including two legs, however, the aftertreatment system may include more than two legs having respective component(s) for reducing the exhaust byproducts. For example, the exhaust can flow or traverse through the aftertreatment system via a first leg and a second leg. The catalyst member (e.g., SCR catalyst member, DOC member, etc.) of each leg can facilitate chemical reactions of the byproducts and reductant to reduce or minimize emissions from a tailpipe of the engine system. For simplicity, the examples herein can provide the SCR catalyst member or the DOC member as the catalyst member of the aftertreatment system. Each leg of the aftertreatment system can be dosed with ammonia (NH3) (e.g., reductant) to reduce the exhaust byproduct. The dosage of reductant can be based on $NO_x$ measurements (and/or other factors, such as exhaust gas mass flow rate of the exhaust gas) from the $NO_x$ sensor of the respective leg.

However, some users may tamper with the aftertreatment system, for instance, by moving the $NO_x$ sensor from one leg to another, for example, in an attempt to potentially alter (e.g., reduce) the amount of reductant dosage during the aftertreatment system operation. In these cases, it may be challenging to detect the sensor tampering during the operation of the aftertreatment system given that the sensor readings are still being captured, thereby potentially leading to inaccurate reductant dosage and/or $NO_x$ slip at the tailpipe.

The systems, methods, and apparatuses described herein are configured to detect tampering of the aftertreatment system, such as displacement/misplacement of the sensor (e.g., $NO_x$ sensor). The terms sensor tampering, sensor displacement, sensor misplacement, or like terms are used interchangeably herein, and are indicative of removing the $NO_x$ sensor from one leg (e.g., removing completely or moving to another leg). In various embodiments, the systems and methods of the technical solution include a controller (e.g., computing device or data processing system) configured to perform features or functionalities discussed herein for sensor tampering detection. The controller includes at least one processor coupled to at least one memory. For example, the controller determines satisfaction of one or more enabling conditions. In response to the satisfaction of the one or more enabling conditions, the controller doses reductant to the first SCR system using the first doser and to the second SCR system using the second doser. The controller determines, in response to the dosing, a first NOx value of the first SCR system based on a reading from the first NOx sensor, and a second NOx value of the second SCR system based on a reading from the second NOx sensor. The controller stops dosing the first SCR system for a first time period in response to the first NOx value and the second NOx value reaching a first predetermined threshold. At the end of a second time period after stopping dosing of the first SCR system, the controller measures a third NOx value of the first SCR system based on the reading from the first NOx sensor and measures a fourth NOx value of the second SCR system based on the reading from the second NOx sensor. The controller determines a first difference between the third NOx value and the first NOx value. The controller determines a second difference between the fourth NOx value and the second NOx value. The controller generates an indication regarding whether the first NOx sensor is displaced based on the first difference and the second difference.

Through these features, embodiments described herein are capable of detecting the tampering of the $NO_x$ sensor within the aftertreatment system, such that the operator and/or service technician can be notified to address the sensor misplacement. As a result, embodiments described herein are capable of reducing $NO_x$ slip downstream from the SCR system caused by system tampering and bringing the aftertreatment system into compliance with the environmental regulations.

II. Overview of Sensor Tampering Detection

Referring to the figures generally, the various embodiments disclosed herein relate to systems, apparatuses, and methods for detecting sensor tampering. Components in aftertreatment systems to reduce byproducts (e.g., $NO_x$, soot, etc.) of the exhaust include an SCR system that utilizes a two-step process to reduce harmful $NO_x$ emissions present in exhaust or a DOC member to filter or oxidize hydrocarbon, carbon monoxide, or unburned fuel and oil. Referring to the SCR, first, a doser injects a reductant into the exhaust stream. This reductant may be a urea, diesel exhaust fluid (DEF), Adblue®, a urea water solution (UWS), an aqueous urea solution (e.g., AUS32, etc.), or another similar fluid. The reductant may decompose to NH3 post-injection. Then, this mixture is run through an SCR catalyst member that, when at a certain temperature, causes a reaction in the mixture that converts the harmful $NO_x$ particles into pure nitrogen and water. In operation, non-decomposed reductant and non-reacted ammonia may be stored within the catalyst member (e.g., SCR catalyst member) to be chemically reacted with the exhaust product (e.g., $NO_x$ particles, etc.).

The $NO_x$ sensor(s) can be used to measure the amount of $NO_x$ (e.g., $NO_x$ value) of the exhaust byproducts at various positions/locations within the aftertreatment system. At least one $NO_x$ sensor can be positioned upstream from (e.g., positioned at the inlet or before) the SCR system to measure the amount of $NO_x$ entering the SCR system. At least one $NO_x$ sensor can be positioned downstream from (e.g., positioned at the outlet or after) the SCR system to measure the amount of $NO_x$ that remained or slipped past the SCR system (e.g., not converted into pure nitrogen and water). The measured $NO_x$ values can be used to adjust the reductant dosage for enhancing the conversion efficiency of the SCR system (e.g., differences between upstream and downstream $NO_x$ values). However, in a tampered system where the $NO_x$ sensor from one leg is misplaced or displaced to another leg, the reductant dosage may be inaccurate for the leg without the $NO_x$ sensor. For simplicity and examples discussed herein, the tampering can assumed to be for the $NO_x$ sensor downstream from the SCR system in one of the legs. For instance, the tampering can involve displacing the $NO_x$ sensor positioned downstream from the respective SCR system from the first leg to the second leg or vice versa.

Therefore, to minimize potential $NO_x$ slip from the SCR system and maintain compliance with the environmental regulations, the systems and methods discussed herein can perform operations to detect sensor tampering in the aftertreatment system. For example, the systems and methods can perform ANR override to monitor characteristics of sensor measurements (e.g., $NO_x$ sensor measurement) responsive to changes in the reductant dosage, thereby enabling the detection of whether the $NO_x$ sensors (e.g., first and second $NO_x$ sensors expected to be positioned in their respective legs) are located in their respective legs or are instead located in the same leg of the aftertreatment system.

Referring now to FIG. 1, a schematic diagram of a system 10 with a controller 100 is shown, according to an example embodiment. The system 10 includes an internal combustion engine 20 (referred to as an "engine" hereinafter) coupled to an exhaust aftertreatment system 22 that is in exhaust gas-receiving communication with the engine. As shown, the exhaust aftertreatment system 22 is made up of multiple legs (e.g., first leg 22A and second leg 22B), each leg including respective one or more components of the exhaust aftertreatment system 22. Although two legs are shown and described for purposes of examples herein, the exhaust aftertreatment system 22 may include more than two legs composed of additional component(s) of the exhaust aftertreatment system 22. The controller 100 is coupled to or in communication with the system 10 along with an operator input/output (I/O) device 120. The system 10 may be embodied in a vehicle. The vehicle may include an on-road or an off-road vehicle including, but not limited to, line-haul trucks, mid-range trucks (e.g., pick-up trucks), cars, boats, tanks, airplanes, locomotives, mining equipment, and any other type of vehicle. The vehicle may include a transmission, a fueling system, one or more additional vehicle subsystems, etc. In this regard, the vehicle may include additional, less, and/or different components/systems, such that the principles, methods, systems, apparatuses, processes, and the like of the present disclosure are intended to be applicable with any other vehicle configuration. It should also be understood that the principles of the present disclosure should not be interpreted to be limited to vehicles; rather, the present disclosure is also applicable with stationary pieces of equipment such as a power generator or genset.

The engine 20 may be a compression-ignition internal combustion engine that utilizes diesel fuel. In various other embodiments, the engine 20 may be structured as any other type of engine (e.g., spark-ignition) that utilizes any type of fuel (e.g., gasoline, natural gas, etc.). In some embodiments, the vehicle may be another type of vehicle, such as a hybrid vehicle containing one or more electric motors, a fuel cell vehicle, and so on. Thus, while the engine 20 is structured as a diesel-powered internal combustion engine herein, other embodiments are contemplated to fall within the scope of the present disclosure.

Within the internal combustion engine 20, air from the atmosphere is combined with fuel and combusted to power the engine. Combustion of the fuel and air in the compression chambers of the engine 20 produces exhaust gas that is operatively vented to an exhaust manifold (not shown) and to the aftertreatment system 22.

Each of the legs (e.g., the first leg 22A and the second leg 22B) of the exhaust aftertreatment system 22 includes a diesel oxidation catalyst (DOC) member 30, a diesel particulate filter (DPF) member 40, and a selective catalytic reduction (SCR) system 52 with an SCR catalyst member 50, and an ammonia oxidation (AMOx) catalyst member 60. The first leg 22A includes DOC member 30A, DPF member 40A, SCR system 52A with a first SCR catalyst member 50A, and AMOx catalyst member 60A. The second leg 22B includes DOC member 30B, DPF member 40B, SCR system 52B with a second SCR catalyst member 50B, and AMOx catalyst member 60B. For simplicity, the components of the respective legs described herein can be labeled generally, for instance, as DOC member 30, DPF member 40, SCR system 52 with a respective SCR catalyst member 50, and AMOx catalyst member 60 associated with the respective first leg 22A or the second leg 22B.

The exhaust aftertreatment system 22 further includes an exhaust gas recirculation (EGR) system 70. The SCR systems 52A and 52B of the respective legs further include reductant delivery systems that has reductant sources 54A-B (e.g., reductant source 54 of the legs) that supplies reductant to reductant dosers 56A-B (e.g., referred to generally as doser 56 for the first leg 22A and the second leg 22B) via reductant lines 58A-B, respectively.

In an exhaust flow direction, as indicated by directional arrow 29, exhaust gas flows from the engine 20 into inlet piping 24 of the exhaust aftertreatment system 22. From the inlet piping 24, in the first leg 22A, the exhaust gas flows into the DOC member 30 and exits the DOC member 30 into a first section of exhaust piping 28A. From the first section of exhaust piping 28A, the exhaust gas flows into the DPF member 40 and exits the DPF member 40 into a second section of exhaust piping 28B. From the second section of exhaust piping 28B, the exhaust gas flows into the SCR catalyst member 50 and exits the SCR catalyst member 50 into the third section of exhaust piping 28C. As the exhaust gas flows through the second section of exhaust piping 28B, it is periodically dosed with reductant by the reductant doser 56. Accordingly, the second section of exhaust piping 28B acts as a decomposition chamber or tube to facilitate the decomposition of the reductant to ammonia. From the third section of exhaust piping 28C, the exhaust gas flows into the AMOx catalyst member 60 and exits the AMOx catalyst member 60 into outlet piping 26 before the exhaust gas is expelled from the aftertreatment system 22. Similarly, in the second leg 22B, the exhaust gas flows through pipings 28D-28F passing the various components in the second leg 22B and into the outlet piping 26.

Based on the foregoing, in the illustrated embodiment, the DOC member 30 (e.g., DOC member 30A or DOC member 30B) is positioned upstream of the DPF member 40 (e.g., DPF member 40A or DPF member 40B) and the SCR catalyst member 50 (e.g., SCR catalyst member 50A or SCR catalyst member 50B), and the SCR catalyst member 50 (e.g., SCR catalyst member 50A or SCR catalyst member 50B) is positioned downstream of the DPF member 40 (e.g., DPF member 40A or DPF member 40B) and upstream of the AMOx catalyst member 60 (e.g., AMOx catalyst member 60A or AMOx catalyst member 60B). However, in alternative embodiments, other arrangements of the components of the exhaust aftertreatment system 22 are also possible. Further, and for simplicity, the components of a leg in the exhaust aftertreatment system 22 may be similar to another leg. Alternatively, one or more components or the arrangement of the components in the first leg 22A may be different from those in the second leg 22B, and so forth.

The DOC member 30 may be structured to have any number of different types of flow-through designs. The DOC member 30 may be structured to oxidize at least some particulate matter in the exhaust (e.g., the soluble organic fraction of soot) and reduce unburned hydrocarbons and CO in the exhaust to less environmentally harmful compounds. For example, the DOC member 30 may be structured to reduce the hydrocarbon and CO concentrations in the exhaust to meet the requisite emissions standards for those components of the exhaust. An indirect consequence of the oxidation capabilities of the DOC member 30 is the ability of the DOC member 30 to oxidize NO into $NO_2$. In this manner, the level of $NO_2$ exiting the DOC member 30 is equal to the $NO_2$ in the exhaust generated by the engine 20 in addition to the $NO_2$ converted from NO by the DOC member 30.

In addition to treating the hydrocarbon and CO concentrations in the exhaust, the DOC member 30 may also be used in the controlled regeneration of the DPF member 40, SCR catalyst member 50, and AMOx catalyst member 60. This can be accomplished through the injection, or dosing, of unburned HC into the exhaust upstream of the DOC member 30. Upon contact with the DOC member 30, the unburned HC undergoes an exothermic oxidation reaction which leads to an increase in the temperature of the exhaust exiting the DOC member 30 and subsequently entering the DPF member 40, SCR catalyst member 50, and/or the AMOx catalyst member 60. The amount of unburned HC added to the exhaust is selected to achieve the desired temperature increase or target controlled regeneration temperature.

The DPF member 40 may be any of various flow-through designs, and is structured to reduce particulate matter concentrations (e.g., soot and ash) in the exhaust to meet requisite emission standards. The DPF member 40 captures particulate matter and other constituents, and thus can be periodically regenerated to burn off the captured constituents. Additionally, the DPF member 40 may be structured to oxidize NO to form $NO_2$ independent of the DOC member 30.

As discussed above, the SCR system 52 includes a reductant delivery system. The reductant delivery system includes a reductant source 54, pump (not shown), and a doser 56 (e.g., sometimes referred to as delivery mechanism 56). The reductant source 54 can be a container or tank capable of retaining a reductant. The reductant source 54 is in reductant supplying communication with the pump, which is structured to pump reductant from the reductant source 54 to the delivery mechanism 56 via a reductant delivery line 58. The delivery mechanism 56 is positioned upstream of the SCR catalyst member 50. The delivery mechanism 56 is selectively controllable to inject reductant directly into the exhaust stream prior to entering the SCR catalyst member 50. As described herein, the controller 100 is structured to control a timing and amount of the reductant delivered to the exhaust, such as based on the amount of $NO_x$ measured by the $NO_x$ sensor 12 upstream from the SCR system 52. The reductant may decompose to produce ammonia. As briefly described above, the ammonia reacts with $NO_x$ in the presence of the SCR catalyst member 50 to reduce the $NO_x$ to less harmful emissions, such as $N_2$ and $H_2O$. The $NO_x$ in the exhaust stream includes $NO_2$ and NO. Both $NO_2$ and NO are reduced to $N_2$ and $H_2O$ through various chemical reactions driven by the catalytic elements of the SCR catalyst member in the presence of $NH_3$.

In some embodiments, the controller 100 is structured to control the delivery mechanism 56 for supplying the reductant according to an ammonia-to-$NO_x$ ratio (ANR). As the $NO_x$ content (e.g., engine out $NO_x$) increases, the controller 100 can control the delivery mechanism 56 to increase (or maintain) the reductant dosage to satisfy/meet the ANR. Further, as the $NO_x$ content decreases, the controller 100 can control the delivery mechanism 56 to decrease (or maintain) the reductant dosage to satisfy the ANR. The controller 100 is configured to override the ANR to adjust the amount of reductant being dosed into the exhaust stream. Decreasing the ANR corresponds to a decrease in the reductant dosage and increasing the ANR corresponds to an increase in the reductant dosage. For simplicity, and for purposes of examples herein, the amount of $NO_x$ associated with the ANR can be measured at the engine outlet (e.g., $NO_x$ sensor at the outlet of the engine 20). In some other examples, the aftertreatment system 22 can include $NO_x$ sensors 12 upstream from the DOC members 30 of the legs, and the $NO_x$ measurements from these $NO_x$ sensors 12 can be used to determine the ANR associated with the respective legs.

In some embodiments, the SCR catalyst member 50 is a vanadium-based catalyst member, and in other embodiments, the SCR catalyst member is a zeolite-based catalyst member, such as a copper-zeolite (Cu—Ze) or an iron-zeolite (Fe—Zu) catalyst member. In one representative embodiment, the reductant is aqueous urea and the SCR catalyst member 50 is a zeolite-based catalyst member. In other embodiments, the reductant includes a first reductant and a second reductant, wherein the first reductant is urea and the second reductant is ammonia.

The AMOx catalyst member 60 may be any of various flow-through catalyst members structured to react with ammonia to produce mainly nitrogen. As briefly described above, the AMOx catalyst member 60 is structured to remove ammonia that has slipped through or exited the SCR catalyst member 50 without reacting with $NO_x$ in the exhaust. In certain instances, the aftertreatment system 22 can be operable with or without an AMOx catalyst member. Further, although the AMOx catalyst member 60 is shown as a separate unit from the SCR system 52 in FIG. 1, in some embodiments, the AMOx catalyst member may be integrated with the SCR catalyst member (e.g., the AMOx catalyst member and the SCR catalyst member can be located within the same housing). As referred to herein, the SCR catalyst member 50 and AMOx catalyst member 60 form the SCR and AMOx system.

The system 10 (e.g., the aftertreatment system 22) includes various sensors. For example, the aftertreatment system 22 includes $NO_x$ sensors 12. The aftertreatment system 22 includes temperature sensors 14. The aftertreatment system 22 includes pressure sensors 16. The sensors can be strategically disposed throughout the aftertreatment system 22, such as upstream, at, or downstream from one or more catalysts (e.g., DOC member 30, DPF member 40, SCR catalyst member 50, and/or AMOx catalyst member 60). The sensors can be in communication with the controller 100 and configured to monitor operating conditions of the system 10. It should be understood that one or more $NO_x$, pressure, temperature, and a variety of other sensors (oxygen sensors, exhaust constituent sensors, NH3 sensors) may also be included in the system and disposed in a variety of locations.

As shown, $NO_x$ sensors 12 may be positioned upstream and downstream of the catalyst member(s) including the SCR catalyst member 50 or the AMOx catalyst member 60. In this configuration, the $NO_x$ sensors 12 can measure at least the amount of $NO_x$ entering the SCR system 52 and the amount of $NO_x$ that remained in the exhaust gas or unconverted by the SCR system 52 (e.g., $NO_x$ that slipped past the SCR catalyst member 50). The difference between the amount of $NO_x$ upstream and downstream from the SCR catalyst member 50 represents or corresponds to the conversion efficiency of the respective legs. For example, the difference between the amount of $NO_x$ upstream and downstream from SCR catalyst member 50A corresponds to the conversion efficiency of the first leg 22A. The difference between the amount of $NO_x$ upstream and downstream from SCR catalyst member 50B corresponds to the conversion efficiency of the second leg 22B. For simplicity, and for purposes of examples herein, the flow split (mass flow rates) and the $NO_x$ content of the exhaust gas traversing the first leg 22A and the second leg 22B can be similar between the legs. Hence, for simplicity and for purposes of examples herein, a relatively higher $NO_x$ content/amount measured downstream from the SCR catalyst member 50 corresponds to a relatively lower conversion efficiency and a relatively higher $NO_x$ content measured downstream from the SCR catalyst member 50 corresponds to a relatively higher conversion efficiency of the respective leg.

In some configurations, one $NO_x$ sensor 12 measures the engine out $NO_x$ while another $NO_x$ sensor 12 measures the SCR catalyst member 50 inlet $NO_x$ amount. This is due to DOC member 30/DPF member 40 potentially oxidizing some portion of the engine out $NO_x$ whereby the engine out $NO_x$ amount would not be equal to the SCR catalyst member 50 inlet $NO_x$ amount. Accordingly, this configuration accounts for this potential discrepancy. The $NO_x$ amount leaving the SCR catalyst member 50 may be measured by a $NO_x$ sensor 12 downstream from the SCR catalyst member 50 and/or $NO_x$ sensor 12 downstream of the AMOx catalyst member 60. The $NO_x$ sensor 12 (in some embodiments, $NO_x$ sensor 12) is positioned downstream of the SCR catalyst member 50 and structured to detect the concentration of $NO_x$ in the exhaust downstream of the SCR catalyst member (e.g., exiting the SCR catalyst member). The measurements (e.g., measured $NO_x$ data) from the $NO_x$ sensor 12 is used by the controller 100 to determine the $NO_x$ conversion efficiency across the respective leg of the aftertreatment system 22. The $NO_x$ conversion efficiency corresponds to the amount of $NO_x$ reduced across the one or more components of the aftertreatment system 22. Although a $NO_x$ sensor 12 is shown at the outlet of the engine 20, respective $NO_x$ sensors 12 can be provided upstream of the respective DOC member 30 or DPF member 40 of each leg.

In some embodiments, the $NO_x$ sensor 12 can be moved from one leg to another, such as from the first leg 22A to the second leg 22B or the second leg 22B to the first leg 22A. For simplicity and for purposes of examples herein, the $NO_x$ sensor 12 downstream from the SCR catalyst member 50 (and/or the AMOx catalyst member 60) from one leg may be moved to another leg. In such configurations where multiple $NO_x$ sensors 12 are positioned at a relatively similar location, the conversion efficiency (e.g., associated with the $NO_x$ content downstream from the SCR catalyst member 50) may be inaccurately computed or measured for at least one of the legs. For example, if a first $NO_x$ sensor of the first leg 22A is moved to the second leg 22B (adjacent to a second $NO_x$ sensor of the second leg 22B), the conversion efficiencies expected to be computed for both legs may only be computed with respect to the second leg. Hence, the measurement data from the first $NO_x$ sensor expected to be in the first leg 22A and the second $NO_x$ sensor expected to be in the second leg 22B are provided to the controller 100 to determine whether the sensor has been misplaced/displaced.

The temperature sensors 14 are associated with one or more catalyst members. The temperature sensors 14 are strategically positioned to detect the temperature of exhaust flowing into the DOC member 30 (e.g., the temperature of the exhaust conduit upstream from the catalyst member), out of the DOC member 30 (e.g., the temperature of the exhaust conduit downstream from the catalyst member) and into another catalyst member (e.g., from the DOC member 30 to the DPF member 40), and out of the DPF member 40 before being dosed with reductant by the doser 56. In some embodiments, at least one temperature sensor 14 may be configured as part of the catalyst member itself, thereby directly measuring a bed temperature of the catalyst member.

The EGR system 70 is structured to recirculate exhaust back to an intake manifold of the engine 20 to be used for combustion. The EGR system 70 includes an EGR cooler 74 and an EGR valve 76. The EGR cooler 74 may be, for example, air-to-air and/or liquid (e.g., coolant)-to-air (e.g., exhaust) heat exchangers, in some applications. The EGR cooler 74 is structured to remove heat from the exhaust prior to the exhaust being re-introduced into the intake manifold. Heat is removed from the exhaust prior to reintroduction to, among other reasons, prevent high intake temperatures that could promote pre-ignition (e.g., engine knock).

Although the exhaust aftertreatment system 22 shown includes the DOC member 30, the DPF member 40, the SCR catalyst member 50, and the AMOx catalyst member 60 positioned in specific locations relative to each other along the exhaust flow path, in other embodiments the exhaust aftertreatment system may include more than one of any of the DOC member 30, DPF member 40, SCR catalyst member 50, and AMOx catalyst member 60 positioned in any of various positions relative to each other along the exhaust flow path.

FIG. 1 is also shown to include an operator input/output (I/O) device 120. The operator I/O device 120 is communicably coupled to the controller 100, such that information may be exchanged between the controller 100 and the I/O device 120. The information exchanged between the controller 100 and the I/O device 120 may relate to one or more components of FIG. 1 or any of the determinations of the controller 100 disclosed herein. The operator I/O device 120 enables an operator (e.g., occupant, etc.) of the vehicle to communicate with the controller 100 and other components of the vehicle, such as those illustrated in FIG. 1. For example, the operator I/O device 120 may include an interactive display, a touchscreen device, one or more buttons and switches, voice command receivers, etc. In some cases, the I/O device 120 may be a part of a vehicle including the engine 20 and the aftertreatment system 22. In some other cases, the I/O device 120 may be a remote device accessible by the operator, such as via a client device. In some aspects, the I/O device 120 may be a server receiving data from the controller 100 of the vehicle.

The controller 100 is structured to monitor the operations, conditions, or events within the system 10 (e.g., components of the aftertreatment system 22). The controller 100 is structured to control, at least partly, operation of the system 10 and associated sub-systems, such as the internal combustion engine 20 and the exhaust aftertreatment system 22. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, Bluetooth, etc. In one embodiment, a controller area network ("CAN") bus provides the exchange of signals, information, and/or data. The CAN bus includes any number of wired and wireless connections. Because the controller 100 is communicably coupled to the systems and components of FIG. 1, the controller 100 is configured to receive data from one or more of the components shown in FIG. 1. For example, the data may include $NO_x$ data (e.g., an incoming $NO_x$ amount from $NO_x$ sensor 12 upstream from the DOC member 30 or SCR catalyst member 50 and an outgoing $NO_x$ amount from $NO_x$ sensor 12 downstream from the SCR catalyst member 50), dosing data (e.g., timing and amount of dosing delivered from doser 56), and vehicle operating data (e.g., engine speed, vehicle speed, engine temperature, flow rate, etc.) received via one or more sensors. As another example, the data may include an input from operator input/output device 120. As described more fully herein, using this data, the controller 100 monitors the multi-leg aftertreatment system 22 to determine if the $NO_x$ sensor 12 from one leg is displaced to another (e.g., the user tampered with at least one $NO_x$ sensor 12) and to detect the misplacement of the $NO_x$ sensor 12, such as to minimize reductant slip or $NO_x$ slip from the erroneous computation of conversion efficiency or measurement of $NO_x$ content downstream from the SCR system 52.

The controller 100 includes a processing circuit including a processor, a memory, and various circuits configured to perform features, functionalities, or operations discussed herein. The processor may be implemented as an application specific integrated circuit (ASIC), one or more field programmable gate arrays (FPGAs), a digital signal processor (DSP), a group of processing components, or other suitable electronic processing components. The memory (e.g., RAM, ROM, Flash Memory, hard disk storage, etc.) may store data and/or computer code for facilitating the various processes described herein. The memory may be communicably connected to the processor and one or more circuits. The memory is configured to provide computer code or instructions to the processor for executing the processes described in regard to the controller 100 herein. Moreover, the memory may be or include tangible, non-transient volatile memory or non-volatile memory. Accordingly, the memory may include database components, object code components, script components, or any other type of information structure for supporting the various activities and information structures described herein.

The controller 100 includes a communications interface. The communications interface may include any combination of wired and/or wireless interfaces (e.g., jacks, antennas, transmitters, receivers, transceivers, wire terminals) for conducting data communications with various systems, devices, or networks structured to enable in-vehicle communications (e.g., between and among the components of the vehicle) and out-of-vehicle communications (e.g., directly with remote computing system). In this regard, in some embodiments, the communications interface includes a network interface. The network interface is used to establish connections with other computing devices by way of a network. The network interface includes program logic that facilitates connection of the controller 100 to the network. The network interface includes any combination of a wireless network transceiver (e.g., a cellular modem, a Bluetooth transceiver, a Wi-Fi transceiver) and/or a wired network transceiver (e.g., an Ethernet transceiver). In some arrangements, the network interface includes the hardware and machine-readable media sufficient to support communication over multiple channels of data communication. Further, in some arrangements, the network interface includes cryptography capabilities to establish a secure or relatively secure communication session in which data communicated over the session is encrypted. For example and regarding out-of-vehicle/system communications, the communications interface may include an Ethernet card and port for sending and receiving data via an Ethernet-based communications network and/or a Wi-Fi transceiver for communicating via a wireless communications network. The communications interface may be structured to communicate via local area networks and/or wide area networks (e.g., the Internet) and may use a variety of communications protocols (e.g., IP, LON, Bluetooth, ZigBee, and radio, cellular, near field communication). Furthermore, the communications interface may work together or in tandem with a telematics unit, if included, in order to communicate with other vehicles in the fleet and/or the remote computing system.

The controller 100 is structured to receive inputs (e.g., signals, information, data, etc.) from the system 10 components/systems and/or the operator I/O device 120. Thus, the controller 100 is structured to control, at least partly, the system 10 components/systems and associated engine 20. As the components of FIG. 2 can be embodied in a vehicle, the controller 100 may be configured as one or more electronic control units (ECU). The controller 100 may be separate from or included with at least one of a transmission control unit, an exhaust aftertreatment control unit, a powertrain control module, an engine control module, etc. In some cases, the controller 100 may be a device remote from the vehicle, such as a remote controller configured to control or communicate with one or more components of the system 10.

Figure 2:
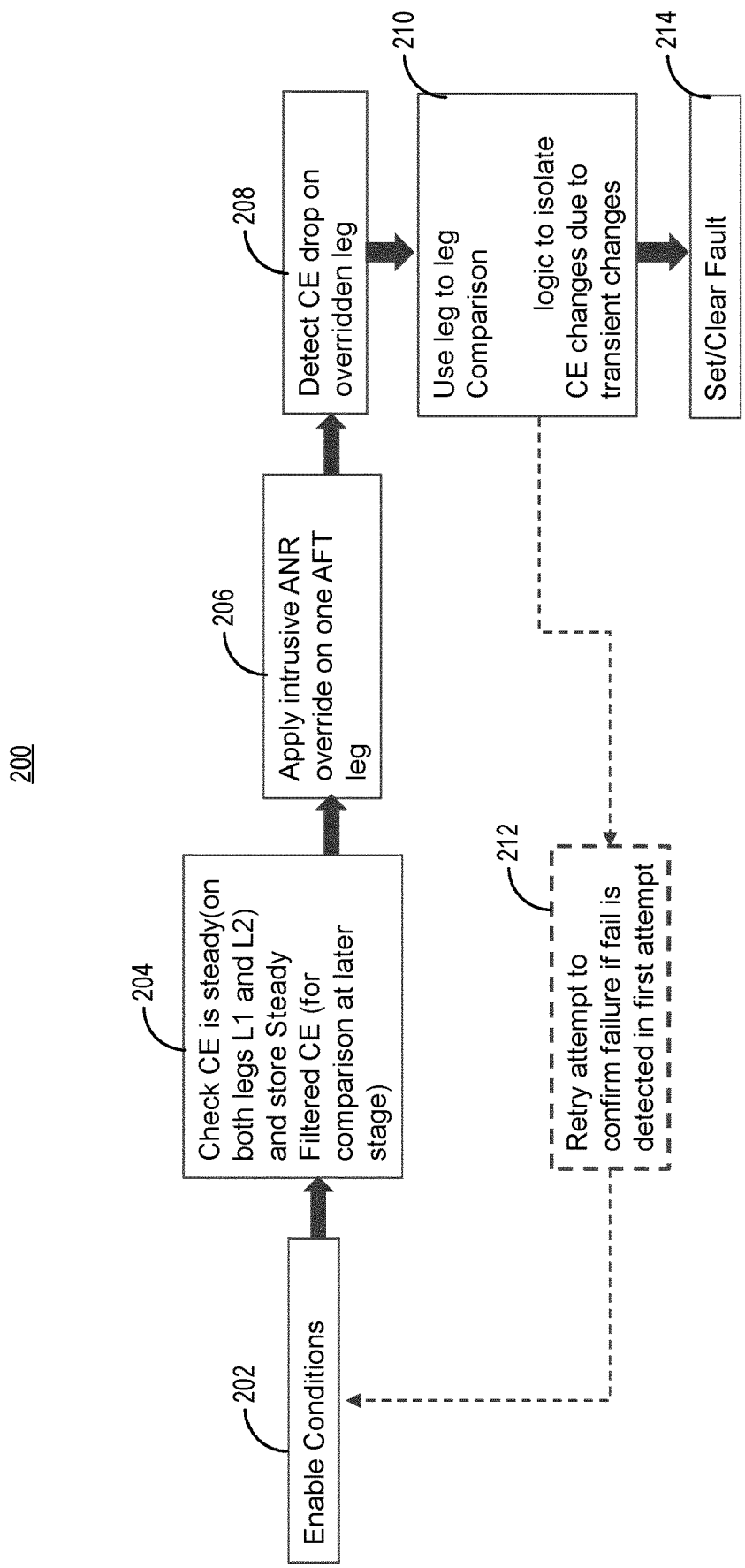
FIG. 2 is an example flow diagram of a diagnostic process overview executed by the controller of FIG. 1.

Referring to FIG. 2, an example flow diagram for a diagnostic process 200 executed by the controller 100 of FIG. 1 is depicted. The steps of FIG. 2 can be performed by the components (e.g., controller 100, I/O device 120, aftertreatment system 22, sensors, etc.) of the system 10, data processing system, cloud computing environment, or any other computing devices described herein in conjunction with FIG. 1. For example, additional or alternative operations of the process 200 can be performed by one or more circuits of the controller 100. Additionally or alternatively, some operations of the process 200 can be performed by a remote device, such as a remote data processing system. Some steps of the process 200 may involve the controller 100 receiving data from components of the aftertreatment system 22, such as one or more sensors, and forwarding the data to the remote device for processing, or vice versa. The process 200 can include an overview of the processes described in conjunction with FIG. 8.

At step 202, the controller 100 determines whether the one or more enable conditions are satisfied. The enable conditions can include at least one of the engine out $NO_x$ satisfying a desired target value/threshold, a bed temperature of the SCR catalyst member 50 being at or above a lower limit/threshold, a rate of change of the bed temperature being at or above an upper limit/threshold, or a time gap between multiple attempts satisfying a time threshold, among other predefined conditions. The engine out $NO_x$ corresponds to the amount of $NO_x$ measured by the $NO_x$ sensor 12 positioned downstream from or at the outlet of the engine 20. The attempts refer to performing the operations discussed herein to detect whether at least one sensor (e.g., $NO_x$ sensor) is misplaced. Responsive to determining that the one or more enable conditions are satisfied, the controller 100 proceeds to step 204.

At step 204, the controller 100 is configured to determine whether the conversion efficiency (CE) of the legs (e.g., the first leg 22A and the second leg 22B) are steady. For example, the controller 100 computes a standard deviation of the CE on each leg for a predetermined time duration (e.g., 1 minute, 2 minutes, 3 minutes, etc.). The controller 100 compares the computed standard deviation to a threshold (e.g., 2%, 4%, 2% to 5%, etc.). If the standard deviations of both legs are within the threshold, the controller 100 determines that the CEs of the legs are steady. Responsive to this determination, the controller 100 filters the stable CEs (sometimes referred to as steady filtered CE) monitored during the time duration. The stable CEs refer to CE values monitored for the time duration that is within the standard deviation threshold. The controller 100 stores the steady filtered CEs in the local memory device or storage. In some cases, the controller 100 stores the steady filtered CEs in a remote data repository. The stored CEs can be at least one of a dataset of CEs computed or monitored during the time duration, an aggregated CE value (e.g., average or mean), a range of CE values, etc. Although the CE is measured and analyzed in these examples, similar analysis can be performed using $NO_x$ values measured by the various $NO_x$ sensors 12.

At step 206, the controller 100 is configured to apply an (intrusive) ANR override on one of the legs of the aftertreatment system 22. Intrusive ANR override can refer to dropping the ANR value below a predetermined threshold (e.g., below 0.9 ANR) or increasing the ANR value above a predetermined threshold (e.g., above 1.5 ANR), such that a detectable signature in the $NO_x$ sensor reading can be obtained, for instance including depletion of the reductant storage (using the relatively low ANR) or reductant slip (using the relatively high ANR). In some embodiments, the intrusive ANR override can refer to increasing or decreasing the ANR value to within a certain ANR value range, such as a low ANR range (e.g., 0.1-0.9 ANR) or a high ANR range (e.g., 1.5-3 ANR). In some embodiments, an ANR range of 1.1-1.3 (e.g., at greater than 300 degrees Celsius SCR bed temperature) may be targeted. Applying an ANR override on one of the legs refers to adjusting (e.g., increasing or decreasing depending on the ANR override configuration) the ANR for the particular leg, such that the controller 100 can adjust the commands to the SCR system 52 (e.g., delivery mechanism 56) to increase or decrease a certain amount of reductant dosage to satisfy or according to the overridden ANR, for example. With a relatively higher or lower ANR value, the proportion of reductant is increased or decreased relative to the proportion of $NO_x$, respectively. The ANR value can refer to a proportion of reductant compared to a predefined amount $NO_x$. The ANR value used for the override may be predefined by the administrator of the controller 100 or updated according to an instruction from the operator I/O device 120. For instance, the ANR value (e.g., new target ANR value) for one of the legs can be overridden as 0, 0.1, 0.2, 0.4, 2, 3, etc. For example, 0 ANR refers to 0 ppm of reductant per 1 ppm of $NO_x$, 0.4 ANR refers to 4 ppm of reductant per 10 ppm of $NO_x$, or 3 ANR refers to 3 ppm of reductant per 1 ppm of $NO_x$. In another example, if the predefined amount of $NO_x$ is 10 ppm, an ANR value of 0.2 can correspond to 2 ppm of reductant per 10 ppm of $NO_x$. In some embodiments, overriding the ANR can involve the controller 100 sending a command to the SCR system 52 to stop the reductant dosage for a certain duration based on a predefined ANR override value of 0. The duration can be based on the $NO_x$ value or the CE value being changed by a predetermined value or based on a timer value.

In some embodiments, the controller 100 overrides the ANR for a predefined time duration (e.g., 10 seconds, 20 seconds, etc.). In some other embodiments, the controller 100 overrides the ANR until the CE of the overridden leg reaches a threshold (e.g., lower threshold at step 208). For example, the controller 100 may be configured to apply a relatively low ANR override value, e.g., 0, 0.1, or other values below a designated threshold) to the first leg 22A (or one of the legs), such that the changes (e.g., increase in the $NO_x$ readings and/or drop in CE values) are expected to be observed on the overridden leg for identifying sensor tampering within the aftertreatment system 22. The controller 100 monitors the changes to the CE of the first leg 22A. At step 208, the controller 100 may detect that the CE of the first leg drops below a predetermined threshold (e.g., 5% or 10% below the steady CE computed determined prior to applying the ANR override) because of the decrease in the reductant dosage according to the ANR override value. In this case, the $NO_x$ sensor 12 associated with the first leg 22A is positioned in the first leg 22A, thereby detecting the drop of CE subsequent to the reduction of reductant dosage. Although the first leg 22A is used as an example hereinabove, the ANR override may be applied to the second leg 22B, and the controller 100 can perform similarly described operations.

For simplicity, the examples herein provide a relatively low ANR override value to be applied to one of the legs. In some other examples, a relatively high ANR override value (e.g., 2, 2.5, 3, or other values above a designated threshold) can be applied to one of the legs. In this case, the controller 100 is configured to detect a potential increase of CE in the overridden leg, for example. Further, for simplicity, the examples herein provide a first $NO_x$ sensor as the $NO_x$ sensor 12 associated with the first leg 22A (e.g., expected to be on the first leg 22A) and a second $NO_x$ sensor as the $NO_x$ sensor 12 associated with the second leg.

The controller 100 may detect the reduction of CE in the overridden leg in scenarios when the $NO_x$ sensor 12 associated with the overridden leg is positioned as desired or expected. For example, if the first leg 22A is overridden, the controller 100 can expect the CE drop in the first leg 22A when the first $NO_x$ sensor is in the first leg 22A. In another example, if the second leg 22B is overridden, the controller 100 can expect the CE drop in the second leg 22B when the second $NO_x$ sensor is in the first leg 22A.

In some embodiments, in scenarios when the sensor associated with the overridden leg is misplaced or displaced to the other leg, the controller 100 may not detect the reduction of CE in the overridden leg. For example, if the first $NO_x$ sensor is displaced to the second leg 22B (or the second $NO_x$ sensor is displaced to the first leg 22A), the amount of $NO_x$ measured by the first $NO_x$ sensor is associated with the second leg 22B. Hence, the controller 100 may not observe or detect the drop in CE of the first leg 22A because the first $NO_x$ sensor is measuring $NO_x$ downstream from the SCR catalyst member 50 of the second leg 22B. In such cases, the controller 100 is configured to start a timer (e.g., 10 seconds, 20 seconds, etc.) responsive to applying the ANR override. If the controller 100 does not detect the CE drop in the overridden leg upon expiration of the timer, the controller 100 may proceed to step 210 or step 214. In certain embodiments, the controller 100 may apply the ANR override on the other leg instead, for instance, to detect the CE drop on the other leg. Responsive to the expiration of the timer or the CE satisfying the threshold (e.g., CE dropped below a first threshold), the controller 100 can reset the ANR value or remove the ANR override value.

At step 210, the controller 100 utilizes a comparison logic (e.g., leg-to-leg comparison logic) to isolate CE changes due to transient changes. The comparison logic may be described in further detail in conjunction with at least one of FIGS. 3-10. For example, the controller 100 monitors or obtains CE data associated with each leg (the first $NO_x$ sensor and the second $NO_x$ sensor) for a predefined time duration responsive to applying the ANR override. The controller 100 determines the lowest CE value computed for each leg during the predefined time duration. The controller 100 compares the CE values between the legs to determine a difference. If the difference is at or above a predefined threshold (e.g., 10%, 20%, 30%, etc.), the controller 100 proceeds to step 214. Otherwise, if the difference is less than the predefined threshold and the steps 202-210 are performed as part of a first attempt, the controller 100 may proceed to step 212. In some other cases, the controller 100 may continue to step 214 during the first attempt.

In some embodiments, at step 212, the controller 100 is configured to repeat or retry the attempt (e.g., start a second attempt) to confirm if the failure detected in the first attempt is accurate or a false positive. For example, in the second attempt, the controller 100 applies the ANR override on one of the legs using a similar or different ANR values as the first attempt. At step 208 of the second attempt, the controller 100 is configured with a relatively lower threshold (e.g., 10%, 15%, 20%, etc.) for detecting the CE drop on the overridden leg, as part of the confirmation process. Responsive to detecting the CE drop, the controller 100 reset the ANR and proceeds to step 210. Similarly to the first attempt, the controller 100 determines a difference between the lowest CE values of the first leg 22A and the second leg 22B.

Responsive to comparison, the controller 100 proceeds to step 214. At step 214, the controller 100 either generates an indication of a fault (set a fault indicative of sensor misplacement) or clears the fault indication (or stops the diagnostic operation without generating the indication). For example, if the difference (in the first attempt or the second attempt) is greater than or equal to the predefined threshold, the controller 100 determines that the $NO_x$ sensors 12 are at the desired positions within the aftertreatment system 22. Otherwise, if the difference is less than the predefined threshold, the controller 100 determines that the $NO_x$ sensors 12 are not at the desired positions within the aftertreatment system 22. In this case, the controller 100 is configured to generate an indication (e.g., set a fault) regarding the $NO_x$ sensor 12 misplacement.

In various embodiments, the diagnostic process 200 is performed responsive to starting the engine 20. For example, responsive to an engine start event, the controller 100 can perform the operations with respect to the first leg 22A (e.g., ANR override applied on the first leg 22A). Responsive to a second engine start event, the controller 100 may perform the operations with respect to the second leg 22B (e.g., ANR override applied on the second leg 22B). In some cases, the controller 100 may perform the operations with respect to the first leg 22A in the first attempt and with respect to the second leg 22B in the second attempt or vice versa.

In some embodiments, the aftertreatment system 22 can include the ammonia sensor (not shown) downstream from the SCR catalyst member 50 configured to measure the amount of reductant that has slipped past the SCR system 52. Similarly to the operations hereinabove to detect $NO_x$ sensor misplacement, the controller 100 can be configured to detect ammonia sensor misplacement. For example, to detect ammonia sensor misplacement, the controller 100 monitors the amount of reductant downstream from the SCR catalyst member 50 or the delivery mechanism 56. The controller 100 determines that the amount of reductant is stable (e.g., within a predefined standard deviation) for at least a predefined time duration. The controller 100 stores the data regarding the stable reductant amount (e.g., value, range, or metrics). The controller 100 applies a relatively high ANR override value (e.g., 1.5, 2, 2.5, etc.) in one of the legs to detect an increase in measured reductant (e.g., reductant slip or reductant supplied). In some cases, the controller 100 applies a relatively low ANR override value (e.g., 0, 0.1, 0.5, etc.) in one of the legs to detect a decrease in measured reductant. The controller 100 compares the changes in reductant between the legs (e.g., similar to comparing the CEs, described in FIGS. 3-4) to determine whether the ammonia sensor of the overridden leg or the non-overridden leg is misplaced. In some other embodiments, the controller 100 may use the measured amount of reductant, at least in part, to compute the CEs for the legs to detect $NO_x$ sensor misplacement (e.g., reductant slip can be a factor for determining the CEs).

Figure 3:
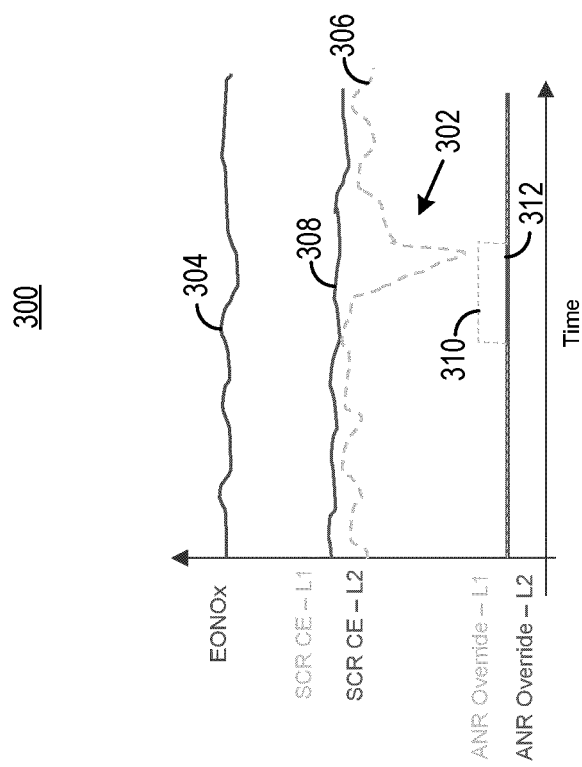
FIG. 3 is an example graph showing behavior of a healthy aftertreatment system during an ammonia-to-$NO_x$ ratio (ANR) override in the aftertreatment system of FIG. 1.

Referring to FIG. 3, an example graph 300 of a healthy aftertreatment system during the ANR override in the aftertreatment system 22 of FIG. 1 is depicted. In this case, a healthy aftertreatment system refers to the aftertreatment system 22 with untampered sensors (e.g., sensor(s) associated with each leg are not displaced to another leg). The graph 300 shows the engine out $NO_x$ readings from the $NO_x$ sensor 12 at the outlet of the engine 20 (304), the CE values of the first leg 22A (e.g., first SCR system 52A) (306), the CE values of the second leg 22B (e.g., second SCR system 52B) (308), enabling status (e.g., enable=1 and disable=0) of the ANR override for the first leg 22A (310), and enabling status of the ANR override for the second leg 22B (312). The data presented in graph 300 can be measured or obtained by various components of the system 10, such as measured by the sensor of the aftertreatment system 22 or obtained by the controller 100. During or after performing the ANR override (e.g., 0.1 ANR for 10 seconds) in the first leg 22A (e.g., to detect tampering of the $NO_x$ sensor 12 associated with the second leg 22B because a drop in CE on one leg but not the other indicates that the sensors are not tampered), the controller 100 detects a drop in CE values (at portion 302) in the first leg 22A because of the decrease in reductant dosage (e.g., reduces the efficiency of $NO_x$ conversion to pure nitrogen and water). In the second leg 22B, the controller 100 may not detect the drop in CE values when the second $NO_x$ sensor is positioned as desired (in the second leg 22B) because the ANR override is performed only on the first leg 22A.

Figure 4:
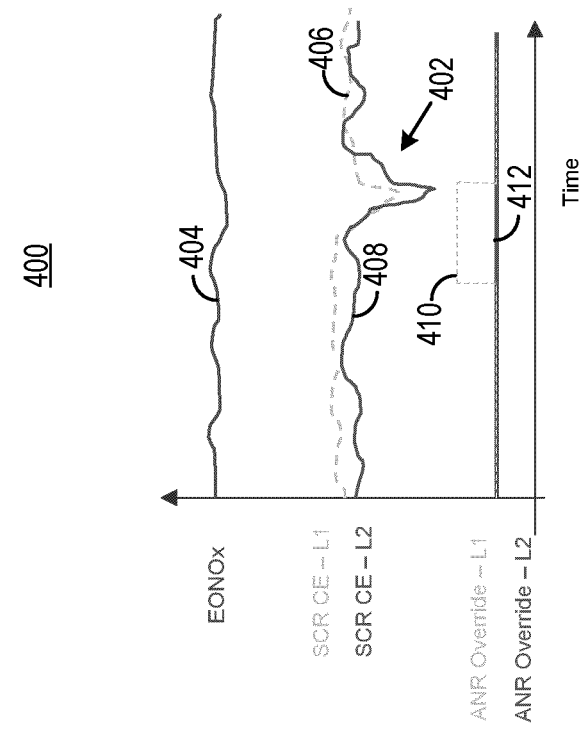
FIG. 4 is an example graph showing behavior of the aftertreatment system with a tampered sensor during the ANR override in the aftertreatment system of FIG. 1.

Referring to FIG. 4, an example graph 400 of the aftertreatment system 22 with a tampered sensor (e.g., $NO_x$ sensor misplacement) during the ANR override in the aftertreatment system of FIG. 1 is depicted. The data presented in graph 400 can be measured or obtained by various components of the system 10, such as measured by the sensor of the aftertreatment system 22 or obtained by the controller 100. Similarly to graph 300, the graph 400 shows the engine out $NO_x$ readings from the $NO_x$ sensor 12 at the outlet of the engine 20 (404), the CE values of the first leg 22A (e.g., first SCR system 52A) (406), the CE values of the second leg 22B (e.g., second SCR system 52B) (408), enabling status (e.g., enable=1 and disable=0) of the ANR override for the first leg 22A (410), and enabling status of the ANR override for the second leg 22B (412). In this graph 400, the second $NO_x$ sensor associated with the second leg 22B is misplaced or displaced to the first leg 22A. Similarly to graph 300, the controller 100 applies the ANR override in the first leg 22A. During or after performing the ANR override, the controller 100 detects a drop in CE values (at portion 402) computed for both the first leg 22A and the second leg 22B because the first and second $NO_x$ sensors are positioned in the first leg 22A with the ANR override. Hence, because the drop in CE values is observed in both the first leg 22A and the second leg 22B, the controller 100 determines that the first $NO_x$ sensor associated with the first leg 22A and the second $NO_x$ sensor associated with the second leg 22B are positioned in the first leg 22A (e.g., second $NO_x$ sensor is displaced/tampered).

The operations performed in FIGS. 3 and 4 are with respect to the first leg 22A (e.g., ANR override in the first leg 22A). In FIG. 4, the drop in CE is observed given that the first $NO_x$ sensor is positioned in the first leg 22A. If the tampered system involves the first $NO_x$ sensor displaced to the second leg 22B, the controller 100 may not detect the drop in CE values for both legs. In such cases, because the ANR override is applied in the first leg 22A and a drop in CE is not detected for both legs, the controller 100 determines that the $NO_x$ sensors 12 are positioned in the second leg 22B (the first $NO_x$ sensor is misplaced). Although the changes to the CE values are used to detect the sensor tampering as in FIGS. 3 and 4, the controller 100 may directly use the $NO_x$ sensor readings (e.g., first $NO_x$ sensor and second $NO_x$ sensor readings) for sensor tampering detection, such as described in conjunction with FIGS. 5 and 6.

Figure 5:
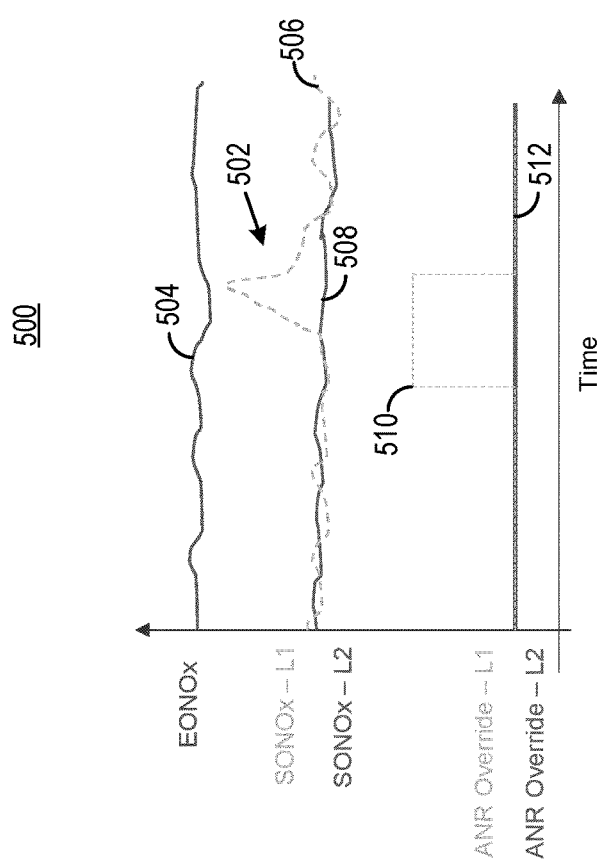
FIG. 5 is an example graph showing behavior of a healthy aftertreatment system during an ANR override in the aftertreatment system using $NO_x$ values of FIG. 1.

Referring to FIG. 5, an example graph 500 of a healthy aftertreatment system during the ANR override in the aftertreatment system 22 using $NO_x$ readings of FIG. 1 is depicted. The controller 100 is configured to monitor the $NO_x$ values (measured by the $NO_x$ sensor 12 downstream from the SCR catalyst member 50) of the respective legs. The graph 500 shows the engine out $NO_x$ readings from the $NO_x$ sensor 12 at the outlet of the engine 20 (504), the $NO_x$ values of the first leg 22A (e.g., downstream or at the outlet of the first SCR system 52A) (506), the $NO_x$ values of the second leg 22B (e.g., downstream or at the outlet of the second SCR system 52B) (508), enabling status (e.g., enable=1 and disable=0) of the ANR override for the first leg 22A (510), and enabling status of the ANR override for the second leg 22B (512). As described herein, the characteristics or behavior of the monitored $NO_x$ values can be opposite from the CE values during or after the ANR override. For example, at portion 502, the controller 100 can apply the ANR override for a certain duration (e.g., 0.1 ANR for 10 seconds). The ANR override can cause a spike in the $NO_x$ sensor reading (e.g., an increase in $NO_x$ values, while observing a decrease in CE values). In this case, the controller 100 applies the ANR override on one leg (e.g., the first leg 22A) to monitor for changes to the $NO_x$ values (e.g., increase in $NO_x$ values). If the spike in $NO_x$ reading occurs for only the overridden leg, the controller 100 determines that the $NO_x$ sensors 12 are positioned in the desired legs, such as shown in graph 500.

Figure 6:
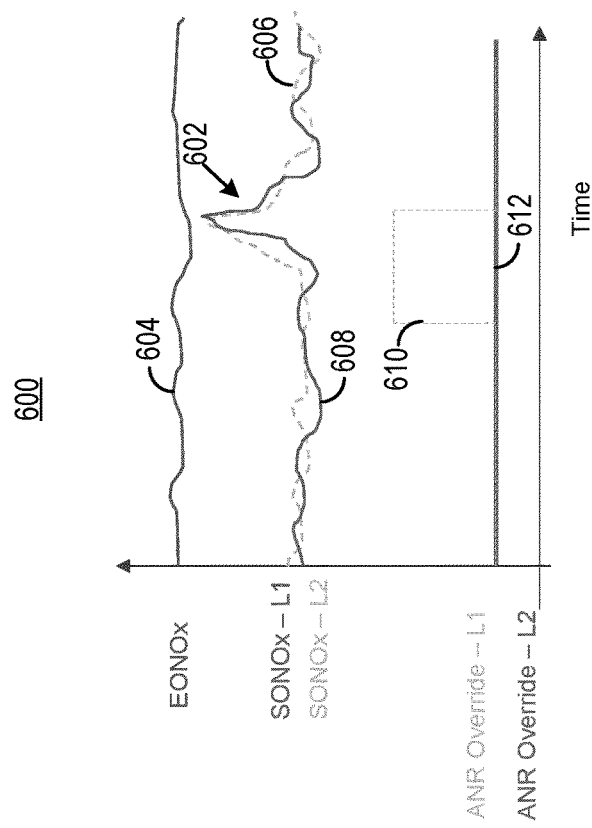
FIG. 6 is an example graph showing behavior of the aftertreatment system with a tampered sensor during the ANR override in the aftertreatment system using $NO_x$ values of FIG. 1.

Referring to FIG. 6, an example graph 600 of the aftertreatment system 22 with a tampered sensor (e.g., $NO_x$ sensor misplacement) during the ANR override in the aftertreatment system using $NO_x$ values of FIG. 1 is depicted. Similar types of data as FIGS. 3-5 can be shown in graph 600, such as the engine out $NO_x$ readings from the $NO_x$ sensor 12 at the outlet of the engine 20 (604), the $NO_x$ values of the first leg 22A (e.g., downstream or at the outlet of the first SCR system 52A) (606), the $NO_x$ values of the second leg 22B (e.g., downstream or at the outlet of the second SCR system 52B) (608), enabling status (e.g., enable=1 and disable=0) of the ANR override for the first leg 22A (610), and enabling status of the ANR override for the second leg 22B (612). In this case, the graph 600 shows example data representative of $NO_x$ sensor readings when the $NO_x$ sensor 12 from the second leg 22B is displaced to the first leg 22A. As shown in portion 602, if the spike or increase in $NO_x$ values (e.g., above a threshold) occurs in both legs (or neither legs), the controller 100 determines that at least one of the $NO_x$ sensors 12 is displaced. Because the overridden leg is the first leg 22A, and the spike occurs on both legs, the controller 100 determines that the second $NO_x$ sensor associated with the second leg 22B is displaced to the first leg 22A because the second $NO_x$ sensor outputs similar readings as the first $NO_x$ sensor representing the $NO_x$ sensor 12 in the overridden leg. The various operations, features, or techniques executed using the CE values can be performed similarly (additionally or alternatively) using $NO_x$ sensor readings (e.g., $NO_x$ readings downstream from or at the outlet of the SCR catalyst member 50 of each leg) to detect $NO_x$ sensor displacement/tampering.

In various embodiments discussed herein, the computed CE values or measured $NO_x$ values of a certain leg may or may not represent the actual CE of the SCR catalyst member 50 or the actual $NO_x$ content traversing the certain leg (e.g., feedback from the $NO_x$ sensor 12 associated with one of the legs may not correspond to the actual tailpipe $NO_x$ in the respective leg). The computed CE values or measured $NO_x$ values of the certain leg are with respect to the $NO_x$ sensors 12, such as the first $NO_x$ sensor and the second $NO_x$ sensor expected to be positioned in the first leg 22A and the second leg 22B, respectively.

Figure 7:
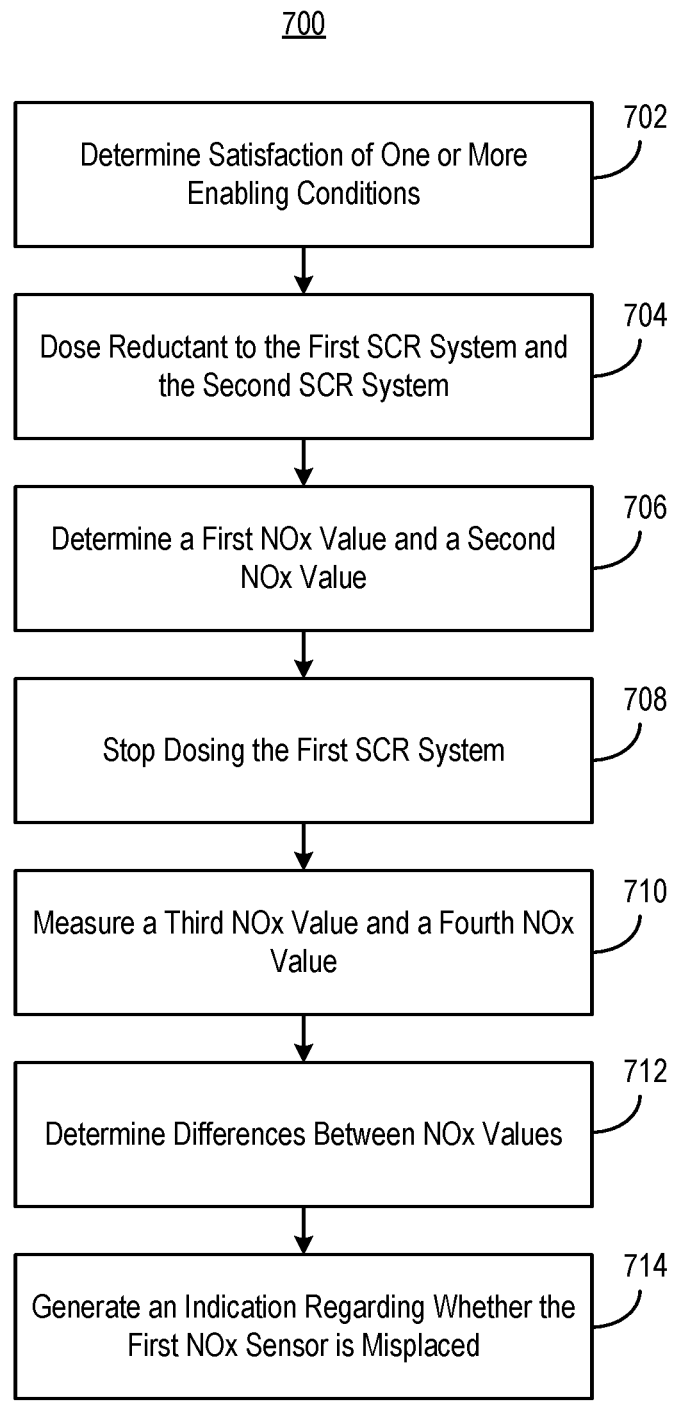
FIG. 7 is an example process flow diagram of a method for detecting sensor tampering in the aftertreatment system of FIG. 1.

Referring to FIG. 7, an example process flow diagram of a method 700 for detecting sensor tampering in the aftertreatment system of FIG. 1 is depicted. The processes, operations, or steps of FIG. 7 can be performed, operated, or executed by the components (e.g., controller 100, I/O device 120, aftertreatment system 22, sensors, etc.) of the system 10, data processing system, cloud computing environment, or any other computing devices described herein in conjunction with FIGS. 1-6. For example, additional or alternative operations of the method 700 can be performed by one or more circuits of the controller 100. Additionally or alternatively, some operations of the method 700 can be performed by a remote device, such as a remote data processing system. The method 700 can include processes for sensor tampering detection by monitoring $NO_x$ values (e.g., instead of CE values described in conjunction with at least one of FIGS. 2 and 8). Certain operations of method 700 can be performed similarly to the operations described in conjunction with FIG. 2.

At step 702, the controller 100 is configured to determine satisfaction of one or more enabling conditions. The one or more enabling conditions can be satisfied in response to the bed temperature of the SCR system 52 (e.g., SCR catalyst member 50) of one or each of the first SCR system 52A and the second SCR system 52B being greater than or equal to a predetermined threshold.

The one or more enabling conditions can be satisfied in response to an engine out $NO_x$ value of at least one of the first leg 22A or the second leg 22B being greater than or equal to a predetermined threshold. The engine out $NO_x$ value is measured by at least one $NO_x$ sensor 12 positioned at the outlet of or downstream from the engine 20 or upstream from the DOC member 30, among other components (e.g., SCR catalyst member 50, etc.) of each leg. The predetermined thresholds can be configured by the administrator of the controller 100 or according to configuration information from the operator I/O device 120, for example. In some embodiments, the one or more enabling conditions can include the rate of change of the bed temperature of the SCR system 52 and/or a time between each attempt for detecting the sensor misplacement (e.g., attempts between performing the operations discussed herein). In some embodiments, the enabling conditions may include additional or other enabling conditions than the ones described above.

At step 704, the controller 100 is configured to dose reductant to the first SCR system 52A and the second SCR system 52B. The controller 100 starts dosing reductant in response to the satisfaction of the one or more enabling conditions. The controller 100 commands a first doser (e.g., delivery mechanism 56A) of the first leg 22A to dose reductant to the first SCR system 52A. The controller 100 commands a second doser (e.g., delivery mechanism 56B) of the second leg 22B to dose reductant to the second SCR system 52B.

In some embodiments, the initial reductant dosing operation is performed prior to considering the one or more enabling conditions. For example, after starting the engine 20, the controller 100 can command the dosers to dose reductant to the first SCR system 52A and the second SCR system 52B. Afterward, the controller 100 determines whether the one or more enabling conditions are satisfied to step 706, among other steps, for example.

At step 706, in response to the reductant dosing at the step 704, the controller 100 is configured to determine a first $NO_x$ value and a second $NO_x$ value (alternatively may be a first CE value or a second CE value). The controller 100 determines the first $NO_x$ value according to a reading or measurement from the first $NO_x$ sensor (e.g., $NO_x$ sensor 12 associated with or expected to measure $NO_x$ for the first leg 22A). The controller 100 determines the second $NO_x$ value according to a reading from the second $NO_x$ sensor (e.g., $NO_x$ sensor 12 associated with or expected to measure $NO_x$ for the second leg 22B). The first and second $NO_x$ values represent the amount of $NO_x$ at the outlet of the first SCR system 52A and the second SCR system 52B, respectively. These $NO_x$ values measured at the step 706 are used to determine a steady state CE of the first SCR and the second SCR. For example, the controller 100 detects that the $NO_x$ sensor readings of the first and second $NO_x$ sensors are within a predefined standard deviation (e.g., 2%, 3%, etc.) for at least a predefined time duration. The controller 100 aggregates the $NO_x$ sensor readings (e.g., average, mean, median, etc.) of each leg. Based on the aggregated $NO_x$ sensor readings, the controller 100 determines the first $NO_x$ value and the second $NO_x$ value, for example. In some cases, the controller 100 uses the highest and/or lowest $NO_x$ readings of each leg as the first and second $NO_x$ values. The controller 100 is configured to store the first and second $NO_x$ values for comparison with other $NO_x$ values after applying ANR override.

In some embodiments, the controller 100 determines whether the first and second $NO_x$ values reach a first predetermined threshold. The predetermined threshold may be indicative of the steady state condition. In some embodiments, the predetermined threshold may be a standard deviation in each of the first NOx value and the second NOx value measured at the step 706 from previously determined NOx values at the first SCR and the second SCR, respectively, or from designated NOx values in a predetermined time period (e.g., 2 minutes). The controller 100 proceeds to step 708 in response to the first and second $NO_x$ values reaching the predetermined threshold.

At step 708, the controller 100 is configured to adjust the dosing of the first SCR system 50A for a time period (e.g., first time period), e.g., in response to the first $NO_x$ value and the second $NO_x$ value reaching the first predetermined threshold indicative of a steady state condition. In some other embodiments, the controller 100 is configured to adjust dosing of the second SCR system 50B instead of the first SCR system 50A. For purposes of examples herein, the controller 100 sends a command to the first doser to adjust the dosing for the first SCR system 50A. In this case, the controller 100 applies the ANR override on the first leg. The controller 100 adjusts the reductant dosage to satisfy the ANR override value. In some embodiments, the ANR override value can be 0, such that the controller 100 is configured to stop the reductant dosing of the first SCR system 50A, for example.

In some cases, the time period for adjusting the reductant dosing (or applying the ANR override) can be predefined by the administrator. In some other cases, the time period is based on the time that it takes for the first NOx value to change by a predetermined percentage or amount, such as 5%, 10%, 15%, 20%, etc. In some embodiments, the predetermined percentage can be based on the attempt. In this case, in a first attempt for detecting sensor misplacement, the controller 100 configures or sets a relatively lower percentage (e.g., 5%) compared to a second attempt (e.g., 10%, 15%, etc.).

At step 710, the controller 100 is configured to measure a third $NO_x$ value and a fourth $NO_x$ value. For example, at the end of another time period (e.g., second time period different from the first time period) after adjusting the dosing of the first SCR system 52A, the controller 100 measures a third NOx value of the first SCR system 52A according to the reading from the first NOx sensor and measures a fourth NOx value of the second SCR system 52B according to the reading from the second NOx sensor. The second time period can be an extension of the first time period. The second time period is used or set to account for the reductant storage of the SCR system 52 because a certain amount of reductant may remain in the SCR system storage after adjusting the reductant dosing. In such cases, the spike (for $NO_x$ values) or drop (for CE values), or other changes in characteristics of the $NO_x$ sensor readings, may not be captured until at least a certain amount of time after adjusting the reductant dosing.

In some embodiments, the third and fourth $NO_x$ values can represent the highest $NO_x$ values measured by the first and second $NO_x$ sensors during the time period(s) (e.g., first and/or second time periods). In some cases, the third and fourth $NO_x$ values may represent an average, mean, median, etc. of the measurements during the time period(s).

At step 712, the controller 100 is configured to determine the differences between $NO_x$ values. For example, the controller 100 determines a first difference between the third $NO_x$ value and the first $NO_x$ value. The controller determines a second difference between the fourth $NO_x$ value and the second $NO_x$ value. The (e.g., first and second) differences represent the changes or deviations in the $NO_x$ sensor readings from before and after applying the ANR override or adjusting the reductant dosing.

At step 714, the controller 100 is configured to generate an indication regarding whether the first $NO_x$ sensor is misplaced. The controller 100 is configured to perform a determination on whether the first $NO_x$ sensor is misplaced according to the first difference and the second difference. For example, the controller 100 determines that the first $NO_x$ sensor is not misplaced in response to the first difference being greater than a predetermined threshold (e.g., the maximum or upper limit to the amount or percentage of $NO_x$) and the second difference being less than the predetermined threshold. In this case, the readings from the first and second $NO_x$ sensors are within expectation if positioned in the desired locations (e.g., their associated legs).

In some embodiments, the controller 100 determines a first difference between a first CE value computed before the ANR override and a third CE value computed during or after the ANR override. The controller 100 determines a second difference between a second CE value computed before the ANR override and a fourth CE value computed during or after the ANR override. The first and third CE values computed using readings from the first $NO_x$ sensor and the second and fourth CE values computed using readings from the second $NO_x$ sensor. The controller 100 determines that the second $NO_x$ sensor is not misplaced in response to the first difference being less than a predetermined threshold (e.g., the lower limit for the CE value) and the second difference being at or above the predetermined threshold.

In some embodiments, the controller 100 determines that the second $NO_x$ sensor is not misplaced in response to determining that a difference between the second difference and the first difference is greater than a predetermined threshold (e.g., a lower limit or threshold on the amount or percentage of differences). In some embodiments, the controller 100 determines that the first $NO_x$ sensor is misplaced in response to determining that the first difference is greater than a predetermined threshold (indicative of the first $NO_x$ sensor reading responding to the change in reductant dosing) and a difference between the second difference and the first difference is less than another predetermined threshold. In this case, because the first and second differences are similar to each other (e.g., the difference between the two is less than the threshold), the controller 100 determines that the first and second $NO_x$ sensors are in a similar location (e.g., in the first leg 22A). Hence, the controller 100 is configured to generate an indication that the sensor is misplaced.

In various embodiments, similar operations can be performed to determine whether the first $NO_x$ sensor is misplaced, such as by adjusting the reductant dosing to the second SCR system 52B instead of the first SCR system 52A or based on the absence of the spike or drop on both legs after adjusting the reductant dosing to the first SCR system 52A, for example. Therefore, the controller 100 is configured to perform similar operations to detect whether the first $NO_x$ sensor (or other $NO_x$ sensors in other legs) is misplaced or has been tampered with. In various arrangements, the operations, techniques, or features of method 700 can be described in further detail in conjunction with FIG. 6.

Figure 8:
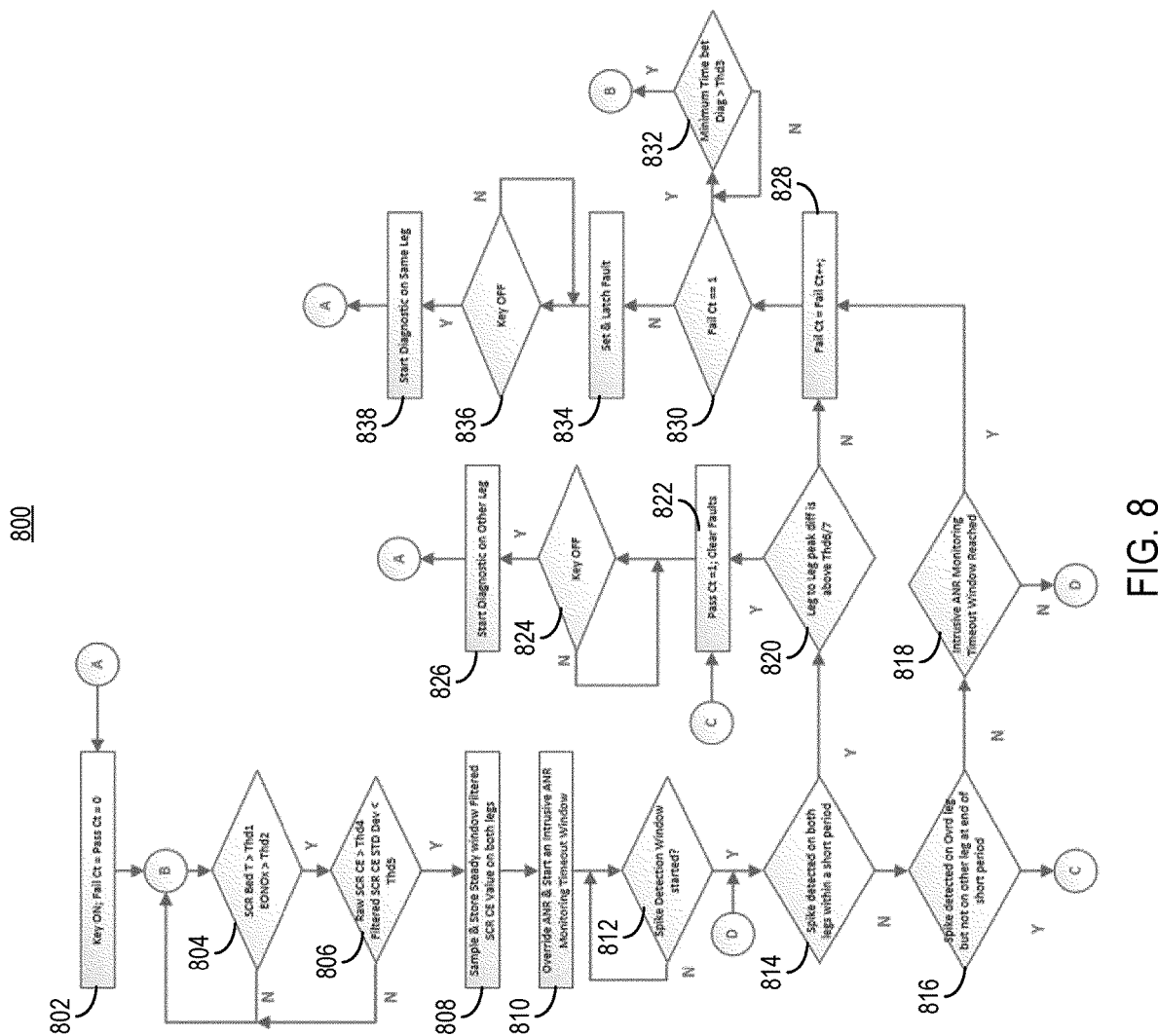
FIG. 8 is an example process flow diagram of a method for performing an example sensor tampering detection of FIG. 7.

FIG. 8 is an example process flow diagram of a method 800 for performing an example sensor tampering detection of FIG. 7. The processes, operations, or steps of FIG. 8 can be performed, operated, or executed by the components (e.g., controller 100, I/O device 120, aftertreatment system 22, sensors, etc.) of the system 10, data processing system, cloud computing environment, or any other computing devices described herein in conjunction with FIGS. 1-7. For example, additional or alternative operations of the method 800 can be performed by one or more circuits of the controller 100. Additionally or alternatively, some operations of the method 800 can be performed by a remote device, such as a remote data processing system. In various embodiments, the method 800 can represent a sequence of instructions or steps to be performed by the one or more components of the system 10, or other devices. The method 800 can include similar or additional processes as described in conjunction with at least FIG. 2.

At step 802, the controller 100 initiates the diagnostic process for detecting sensor misplacement. The controller 100 can initiate the diagnostic process responsive to a start of the engine 20 (e.g., key "ON"). The controller 100 sets/resets variables configured to default. For example, the controller 100 sets a fail count variable and pass count variable to zero.

At step 804, the controller 100 determines whether one or more enabling conditions are satisfied. In this case, the enabling conditions include the bed temperature of the SCR system 52 (or SCR catalyst member 50) of each leg and the engine out $NO_x$. If the bed temperature is at or above a predetermined temperature threshold and the engine out $NO_x$ is at or above a predetermined $NO_x$ threshold, the controller 100 proceeds to step 806. Otherwise, the controller 100 continues to monitor the enabling conditions until they are satisfied. The controller 100 may consider other enabling conditions, such as temperature fluctuations, rate of change of the temperature or engine out $NO_x$, etc.

At step 806, responsive to satisfying the enabling condition(s), the controller 100 determines whether the CE values computed for the legs are above a certain CE threshold (e.g., 80%, 90%, 95%, etc.) and/or the monitored (computed) CEs of the legs are relatively steady (e.g., a standard deviation of the CE values measured for a predefined time duration is less than a predetermined threshold, such as 2%, 3%, etc.). The CE values and/or the standard deviation of the CE values may be a part of the enabling condition(s). If the CE values are at or above the CE threshold and/or the standard deviation of the CE values within a predefined time duration is less than the predetermined threshold, the controller 100 proceeds to step 808. Otherwise, if at least one or both of these conditions are not satisfied, the controller 100 either reverts back to step 804 or continues to monitor the CEs of each leg.

In some embodiments, the controller 100 monitors the $NO_x$ sensor readings for each leg instead of the CE values. The $NO_x$ sensor readings can be from $NO_x$ sensors 12 positioned at the outlet of at least one of the first SCR system 52A and/or the second SCR system 52B. In this case, the controller 100 determines whether the $NO_x$ values of each leg measured for a certain predefined time duration are within a predetermined standard deviation threshold and/or whether the $NO_x$ values of each leg are at or above a $NO_x$ threshold to proceed to step 808 or repeat at least one of the steps 804 or 806.

At step 808, the controller 100 obtains samples of the CE values (or $NO_x$ values) computed for each leg during the steady window. The controller 100 determines at least one CE value (or $NO_x$ value) during the steady window for each leg (e.g., average, median, etc.). The controller 100 stores the CE values for the first leg 22A and the second leg 22B in the memory. A first CE value is computed for the first leg 22A and a second CE value is computed for the second leg 22B, for example.

At step 810, the controller 100 overrides the ANR for one of the legs. For purposes of providing examples herein, the controller 100 overrides the ANR for the first leg 22A. By overriding the ANR, the controller 100 is configured to send a command to the doser (e.g., first doser) to adjust the reductant dosage. In some cases, the controller 100 is configured to adjust (or in some case) the reductant dosage to the SCR system 52. The controller 100 is configured to start an ANR monitoring timeout window (e.g., a first time period) in response to applying the ANR override. In some cases, the ANR monitoring timeout window is based on or corresponds to the time for the monitored CE values to drop below (or $NO_x$ values to spike above) a predetermined percentage, such as 5%, 10%, etc. In some other cases, the ANR monitoring timeout window can be a predefined time duration. The controller 100 is configured to reset the ANR override or restart the reductant dosing at the end of the first time period.

At step 812, the controller 100 determines whether a spike detection window has started. The spike detection window (e.g., second time period) may start responsive to the ANR monitoring timeout window. For example, the spike detection window can start at the end of the first time period. If the second time period has started, the controller 100 proceeds to step 814. Otherwise, the controller 100 remains at step 812 until the first time period ends, e.g., to start the second time period. The controller 100 is configured to detect any spike of the first leg 22A or the second leg 22B during or at the end of the second time period.

During the second time period, the controller 100 determines at least one of the $NO_x$ values or the CE values of the respective SCR systems 52. For example, the controller 100 can determine a third $NO_x$ value of the first SCR system 52A and a fourth $NO_x$ value of the second SCR system 52B after the end of the second time period. In another example, the controller 100 can determine a third CE value of the first SCR system 52A and a fourth CE value of the second SCR system 52B after the end of the second time period, depending on the configuration of the controller 100.

Further, the controller 100 is configured to determine a first difference between the values (e.g., $NO_x$ values or CE values) of the first leg 22A obtained before and after the ANR override and a second difference between the values of the second leg 22B obtained before and after the ANR override (applied on the first leg 22A). The first difference and the second difference are used to determine whether a spike is detected on the first leg 22A or the second leg 22B, respectively. The difference(s) can be in terms of percentage or amount.

At step 814, the controller 100 determines whether a spike is detected for both legs within the spike detection window (e.g., spike detection within the second time period). For example, the controller 100 compares the first difference and the second difference to a predetermined threshold (e.g., 5%, 10%, 15%, or other percentage difference). If the first and second differences associated with the first leg 22A and the second leg 22B, respectively, exceed the predetermined threshold, the controller 100 determines that the spike is detected for both legs (proceeds to step 820). If at least one of the first and/or second differences does not exceed the predetermined threshold, the controller 100 determines that the spike is not detected on both legs (proceeds to step 816).

At step 816, during or at the end of the second period, the controller 100 determines whether a spike is detected on the overridden leg (e.g., first leg 22A in this example) but not on the other leg. If the spike is detected for the first leg 22A and not the second leg 22B, the controller 100 determines that the first $NO_x$ sensor and the second $NO_x$ sensor are correctly positioned in the first leg 22A and the second leg 22B. In this case, the controller 100 proceeds to step 822. If the spike is not detected for both legs, the controller 100 proceeds to step 818.

At step 818, the controller 100 determines whether the second time period has ended (e.g., spike detection window ended). If the second time period ends without the controller 100 detecting any spike, the controller 100 proceeds to step 828. Otherwise, the controller 100 continues to monitor the third and fourth $NO_x$ values or CE values to determine or update the first and second differences for potentially detecting a spike (e.g., revert to step 814).

At step 820, responsive to detecting the spike on both legs, the controller 100 determines whether a difference between the peak (or bottom) of the spike of each leg is greater than or equal to a predetermined threshold (e.g., percentage or amount difference). For example, the third $NO_x$ value or the third CE value can represent the peak or bottom of the spike for the first leg 22A, respectively. The fourth $NO_x$ value or the fourth CE value can represent the peak or bottom of the spike for the second leg 22B, respectively. The controller 100 compares the peak or bottom between the legs to determine the difference. If this difference is at or above the predetermined threshold (e.g., minimum difference threshold), the controller 100 proceeds to step 822. Otherwise, the controller 100 proceeds to step 828.

At step 822, the controller 100 determines that the $NO_x$ sensors 12 are positioned at their desired or expected locations. Hence, the controller 100 sets the pass count variable to 1 and/or clear faults. In this case, the fault can include providing a notification to an administrator that tampering with the $NO_x$ sensor 12 has been detected when applying the sensor tampering detection operation. In response to triggering the fault, an indication (e.g., visual, audio, or haptic feedback) can be presented to the operator of the system 10. At step 824, the controller 100 determines whether the engine 20 is turned off. The controller 100 can wait until the engine 20 is turned off until proceeding to step 826. At step 826, the controller 100 is configured to perform the diagnostic process on the other leg (e.g., the second leg 22B), such as overriding the ANR on the other leg, etc.

At step 828, responsive to the leg-to-leg peak difference being less than the predetermined threshold or absence of a spike on both legs after the expiration of the second time period, the controller 100 increments the fail count variable. For the first attempt at the diagnostic process, the fail count variable is incremented to 1. For the second attempt at the diagnostic process, if the controller 100 reaches this step, the fail count variable is incremented to 0 (e.g., binary variable) or 2.

At step 830, the controller 100 determines whether the fail count variable is 1. If the fail count is 1, the controller 100 proceeds to step 832. Otherwise, the controller 100 proceeds to step 834.

At step 832, the controller 100 may wait for a time duration (e.g., time delay/gap between attempts) to start a second attempt. In response to the time between attempts exceeding a predefined threshold, the controller 100 proceeds back to step 804 to perform another attempt. In the second attempt, the controller 100 may adjust or set another predetermined threshold for the $NO_x$ value increase or CE drop (e.g., from 5% to 10% or to 15%, etc.). After executing the second attempt, if the controller 100 reaches step 828, the fail count is incremented to 0. Accordingly, the controller 100 proceeds to step 830 and subsequently to step 834.

At step 834, the controller 100 generates, sets, and/or latches an indication of a fault responsive to the multiple diagnostic processes. In this case, the controller 100 may generate an indication that the second $NO_x$ sensor is misplaced (or the first $NO_x$ sensor is misplaced when the diagnostic is performed on the second leg 22B).

At step 836, the controller 100 determines whether the engine 20 is off. When the engine 20 is off, the controller 100 proceeds to step 838. At step 838, the controller 100 can perform the diagnostic on the same leg. For example, the controller 100 can perform the diagnostic on the same leg (when the enable condition(s) is/are met) to determine whether the $NO_x$ sensor 12 is still misplaced.

Figure 9:
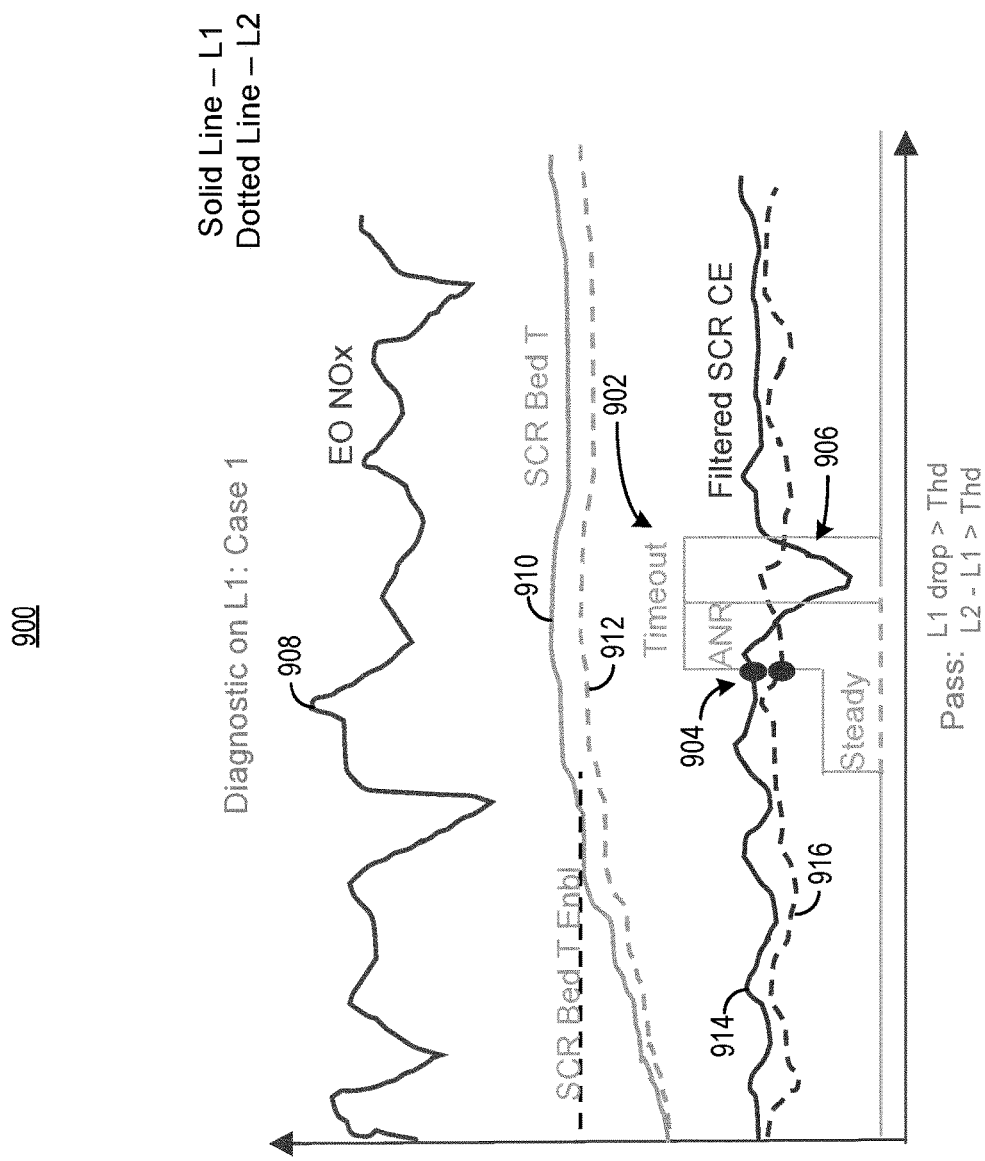
FIG. 9 is an example graph showing a first diagnostic case of performing the methods FIGS. 7 and 8.

Referring to FIG. 9, an example graph 900 showing a first diagnostic case of performing the methods of FIGS. 7 and 8 is depicted. The graph 900 shows the engine out $NO_x$ measured by the $NO_x$ sensor 12 at the outlet of or downstream from the engine 20 (908), the bed temperature of the first SCR system 52A of the first leg 22A (910), the bed temperature of the second SCR system 52B of the second leg 22B (912), the CE values associated with the first SCR system 52A (914), and the CE values associated with the second SCR system 52B (916). In this example, the controller 100 applies the ANR override on the first leg 22A (e.g., diagnostic on the first leg 22A) for determining whether the $NO_x$ sensor 12 on the second leg 22B is misplaced. As shown in portion 902, the controller 100 can determine whether the enabling condition(s) are satisfied, such as the bed temperature of the SCR systems 52 and/or the CE values associated with the SCR systems 52. Responsive to determining that the enabling condition(s) are satisfied, the controller 100 can initiate a first attempt at sensor tampering detection procedures. For example, the controller 100 monitors the CE values of the legs to identify when the CE values are considered steady (e.g., CE values of the legs are within a standard deviation threshold). Once the CE values are considered steady, such as at time instance (904), the controller 100 can obtain and store the CE values (e.g., a first CE value for the first leg 22A and a second CE value for the second leg 22B) during the steady period as part of the first attempt. Subsequently, the controller 100 applies the ANR override on one of the legs for at least a first time period, such as on the first leg 22A in this example. The controller 100 can monitor for changes to the CE values on both legs in a second time period (as shown in portion (906)). In this case, the controller 100 can determine a third CE value for the first leg 22A and a fourth CE value for the second leg 22B during or after applying the ANR override. The third and fourth CE values can represent the lowest CE values in the respective legs, for example.

The controller 100 computes a first difference between the first CE value and the third CE value, which represents the changes to the CE of the first SCR system 52A during or after the ANR override. The controller 100 computes a second difference between the second CE value and the fourth CE value, which represents the changes to the CE of the second SCR system 52B during or after the ANR override. As shown in graph 900, the controller 100 detects a CE drop for the first leg 22A (e.g., the first difference being greater than a predetermined threshold) without the CE drop for the second leg 22B (e.g., the second difference being less than the predetermined threshold). Because the CE drop occurred for the overridden leg and not for the non-overridden leg (e.g., the leg without ANR override), the controller 100 determines that the $NO_x$ sensors 12 associated with the legs are correctly positioned (e.g., not tampered or displaced).

Figure 10:
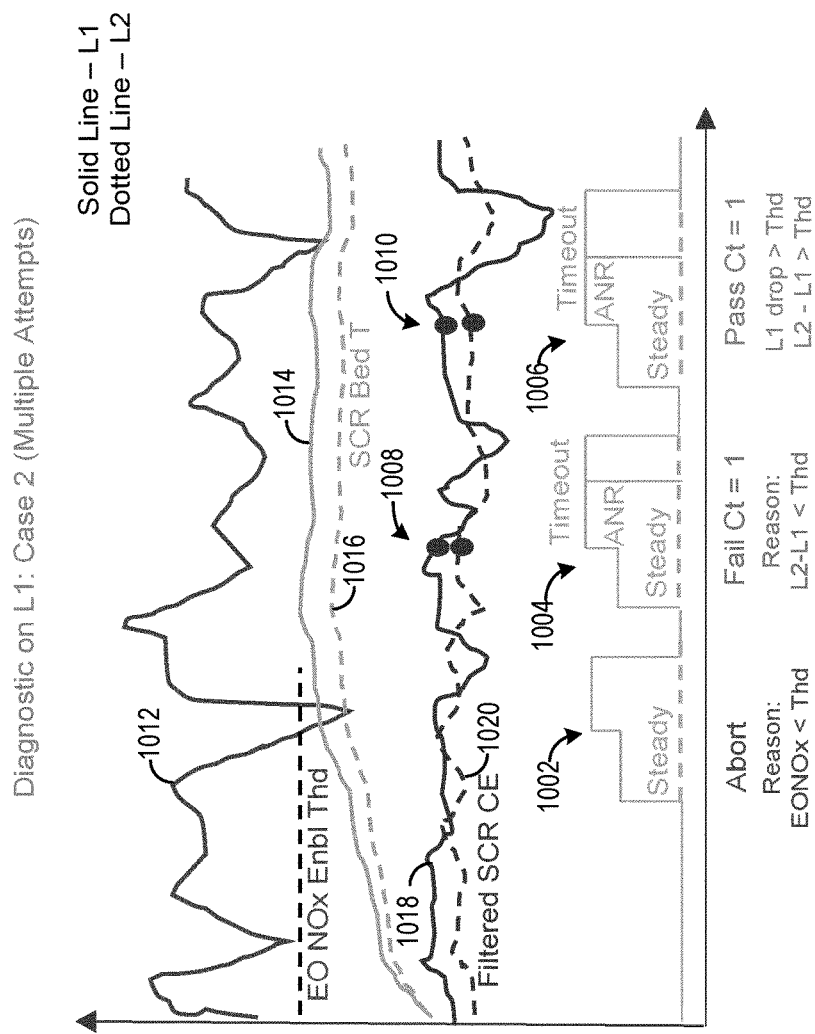
FIG. 10 is an example graph showing a second diagnostic case of performing the methods of FIGS. 7 and 8.

Referring to FIG. 10, an example graph 1000 showing a second diagnostic case of performing the methods of FIGS. 7 and 8 is depicted. The graph 1000 can include similar types of data in conjunction with FIG. 9. For example, the graph 1000 shows the engine out $NO_x$ (1012), the bed temperature of the first SCR system 52A (1014), the bed temperature of the second SCR system 52B (1016), the CE values associated with the first SCR system 52A (1018), and the CE values associated with the second SCR system 52B (1020). In this example, the controller 100 applies the ANR override on the first leg 22A. Various operations described in FIG. 10 may be similarly described in conjunction with at least FIG. 9.

At portion 1002, the controller 100 determines that the one or more enabling conditions (e.g., engine out $NO_x$ in this case) do not satisfy the threshold, such as the engine out $NO_x$ enabling threshold. In this case, the controller 100 abort the attempt at sensor tampering detection. As part of the enabling condition(s), the controller 100 can wait for at least a predefined time duration to perform another attempt (retry attempt) at portion 1004. At portion 1004, the controller 100 monitors for a steady period of the CE values associated with the first leg 22A and the second leg 22B. Responsive to determining that the CE values are steady for a predefined time duration, at (1008), the controller 100 applies the ANR override for the first time period and monitor for changes to the CE values in the second time period, such as described in conjunction with at least FIG. 9. In this case, the controller 100 may determine that the third CE value of the first leg 22A and the fourth CE value of the second leg 22B are less than a predetermined threshold, indicating that the first $NO_x$ sensor and the second $NO_x$ sensor may be in the same leg (e.g., capturing similar data).

To confirm the attempt at portion 1004, the controller 100 initiates a second attempt at portion 1006. The steady period can be detected at (1010). In any subsequent attempt for confirming detected tampering of the sensor, the controller 100 may apply a relatively lower or relatively higher ANR override to the same leg (e.g., decrease from 0.4 ANR to 0.1 ANR, increase from 1.5 ANR to 2 ANR, or stopping the reductant dosing for a relatively longer duration, etc.). Similar procedures from the first attempt of sensor tampering detection can be performed for the second attempt. In this case, the controller 100 determines that the drop in CE value of the first leg 22A (e.g., overridden leg) is below a predetermined threshold. Further, the controller 100 determines that the difference between the first difference and the second difference (or the third CE value and the fourth CE value) is greater than or equal to a predetermined threshold, which can indicate that the $NO_x$ sensors 12 are measuring $NO_x$ on different legs. Therefore, responsive to determining that the difference between the second difference and the first difference is greater than the predetermined threshold, the controller 100 determines that the second $NO_x$ sensor is not displaced because the drop in CE values is not observed from the second $NO_x$ sensor readings.

Figure 11:
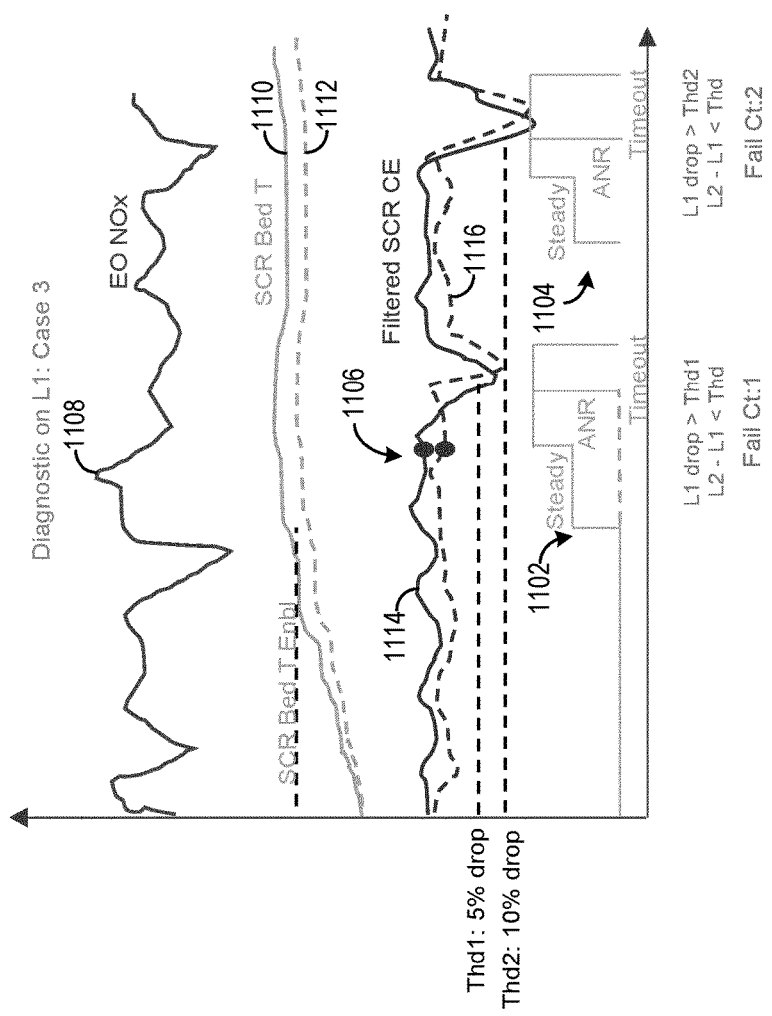
FIG. 11 is an example graph showing a third diagnostic case of performing the methods of FIGS. 7 and 8.

Referring to FIG. 11, an example graph 1100 showing a third diagnostic case of performing the methods of FIGS. 7 and 8 is depicted. The graph 1100 shows similar types of data in conjunction with at least one of FIGS. 9-10. For example, the graph 1100 shows the engine out $NO_x$ (1108), the bed temperature of the first SCR system 52A (1110), the bed temperature of the second SCR system 52B (1112), the CE values associated with the first SCR system 52A (1114), and the CE values associated with the second SCR system 52B (1116). In this example, the controller 100 applies the ANR override on the first leg 22A and the second $NO_x$ sensor is displaced to the first leg 22A. Various operations described in FIG. 11 may be similarly described in conjunction with at least FIGS. 9 and 10.

At portion 1102, the controller 100 detects that the CE values are stable at (1008) and applies the ANR override responsive to detecting the steady window. The controller 100 overrides the ANR (or stops the first doser from dosing reductant to the first SCR system 52A) for a first time period. As shown, the first time period is based on the time when the CE of the first leg 22A drops below a predetermined threshold (e.g., the amount of CE drops is greater than the predetermined threshold), such as 5% on the first attempt. The controller 100 can reset or remove the ANR override responsive to the CE value of the overridden leg reaching the predetermined CE drop threshold. As described in at least one of FIGS. 9 and/or 10, the controller 100 determines the first difference between the first and third CE values of the first leg 22A and the second difference between the second and fourth CE values of the second leg 22B (e.g., CE values before and after ANR override). In this case, the controller 100 determines that the difference between the first difference and the second difference is less than a predetermined threshold, indicating that sensor tampering is detected.

To confirm the result of the first attempt, the controller 100 performs the second attempt at portion 1104. In the second attempt, similar procedures as the prior attempt can be performed but using a relatively lower ANR value (or stopping reductant dosing for a relatively longer duration). Using the relatively lower ANR value, the controller 100 is configured to adjust the dosing of the first leg 22A for a relatively longer duration or by a greater amount compared to the first attempt. For instance, as shown, the controller 100 can apply the ANR override for a third time period based on the time when the CE of the first leg 22A drops below a relatively lower predetermined threshold, such as 10% on the second attempt. In this case, at the end of the fourth time period after adjusting the dosing for the third time period, the controller 100 also detects similar results as the first attempt. For example, the controller 100 detects the CE drop on the first leg 22A greater than the predetermined CE drop threshold. Further, the controller 100 determines that the difference between a third difference (computed for the $NO_x$ values of the first leg 22A in the second attempt) and a fourth difference (computed for the $NO_x$ values of the second leg 22B in the second attempt) is less than the predetermined difference threshold. Because the difference between the third and fourth differences are less than the predetermined difference threshold in both attempts, the controller 100 determines that the second $NO_x$ sensor is displaced in the first leg 22A because the readings from the second $NO_x$ sensor aligned with the readings from the first $NO_x$ sensor used for computing the CE values.

Figure 12:
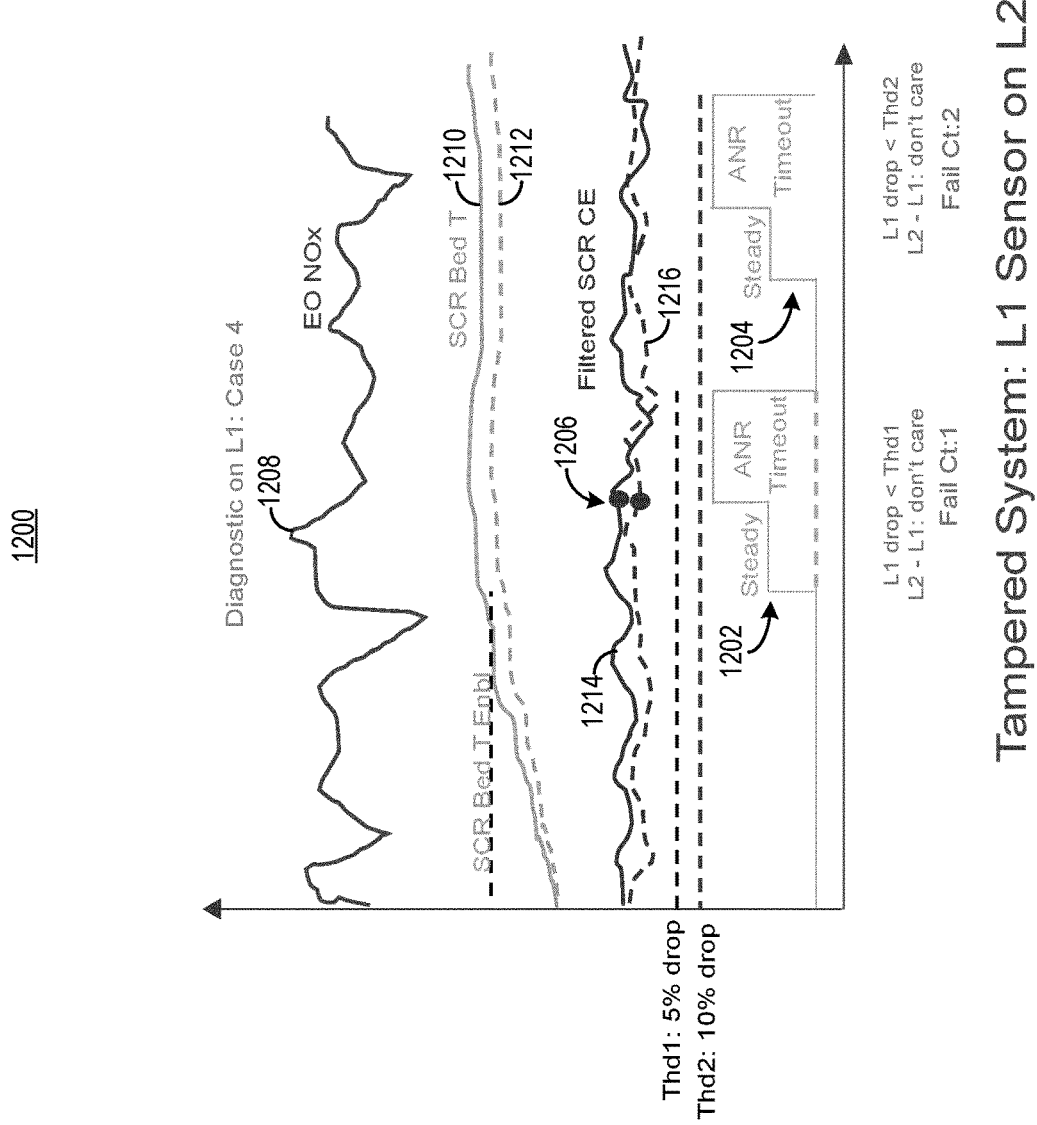
FIG. 12 is another example graph showing a fourth diagnostic case of performing the methods of FIGS. 7 and 8.

Referring to FIG. 12, another example graph 1200 showing a fourth diagnostic case of performing the methods of FIGS. 7 and 8 is depicted. The graph 1200 shows similar types of data in conjunction with at least one of FIGS. 9-11. For example, the graph 1200 shows the engine out $NO_x$ (1208), the bed temperature of the first SCR system 52A (1210), the bed temperature of the second SCR system 52B (1212), the CE values associated with the first SCR system 52A (1214), and the CE values associated with the second SCR system 52B (1216). In this example, the controller 100 applies the ANR override on the first leg 22A and the first $NO_x$ sensor is displaced to the second leg 22B. Various operations described in FIG. 12 may be similarly described in conjunction with at least one of FIGS. 9-11.

At portion 1202, the controller 100 detects that the CE values are stable at (1206) after satisfying the one or more enabling conditions. The controller 100 applies the ANR override responsive to detecting the steady window at (1206). The controller 100 overrides the ANR (or stops the first doser from dosing reductant to the first SCR system 52A) for a certain time period. In this case, the controller 100 may not detect the drop in CE value from the first leg 22A because the first $NO_x$ sensor is positioned in the second leg 22B. Therefore, after a pre-configured expiration time for ANR override, the controller 100 can determine a first difference between the first and third CE values (e.g., CE before and after ANR override) for the first leg 22A. In this case, the controller 100 determines that the first difference is less than a predetermined threshold. The controller 100 determines, according to the first attempt, that the first $NO_x$ sensor may be displaced to the second leg 22B because a drop in CE values is not observed for the overridden leg.

In the second attempt at portion 1204, similar procedures as the first attempt can be performed. In some cases, for the second attempt, the controller 100 can apply a different ANR value (e.g., a relatively lower ANR value) or set a different expiration timer for the ANR override. As shown in graph 1200, similar to the first attempt, the controller 100 determines that the first difference between the first CE value obtained in the steady window and the third CE value obtained during or after the ANR override (e.g., in the second time period) is less than the predetermined threshold after expiration of the ANR override timer. Hence, the controller 100 may detect a potential $NO_x$ sensor displacement from the first leg 22A to the second leg 22B because the readings from the first $NO_x$ sensor do not reflect the amount of $NO_x$ (and CE) expected in the overridden leg.

In some embodiments, responsive to determining that the CE value associated with the overridden leg does not drop below the predetermined CE drop threshold, the controller 100 may perform the ANR override on another leg (e.g., the second leg 22B instead of the first leg 22A). The controller 100 can switch the ANR overridden leg after the first attempt, the second attempt, or the next engine start event, for example. In some cases, the controller 100 may perform the ANR override on the same leg after the next engine start event. In this case, if the characteristics of the CE values remain the same (e.g., CE drop less than the predetermined threshold or the difference between the first and second differences are below the predetermined difference threshold), the controller 100 can determine that the $NO_x$ sensor 12 associated with the overridden leg is displaced to the non-overridden leg expected changes to the $NO_x$ content in traversing the aftertreatment system 22 is not reflected in the $NO_x$ readings from the $NO_x$ sensor associated with the overridden leg.

III. Construction of Example Embodiments

While this specification contains many specific implementation details, these should not be construed as limitations on the scope of what may be claimed but rather as descriptions of features specific to particular embodiments. Certain features described in this specification in the context of separate embodiments can also be implemented in combination in a single implementation. Conversely, various features described in the context of a single implementation can also be implemented in multiple embodiments separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, exhaust gas, liquid reductant, gaseous reductant, aqueous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various example embodiments is illustrative only and not restrictive in character. All changes and modifications that come within the spirit and/or scope of the described embodiments are desired to be protected. It should be understood that some features may not be necessary, and embodiments lacking the various features may be contemplated as within the scope of the application, the scope being defined by the claims that follow. When the language "a portion" is used, the item can include a portion and/or the entire item unless specifically stated to the contrary.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W to P, etc.) herein are inclusive of their maximum values and minimum values (e.g., W to P includes W and includes P, etc.), unless otherwise indicated. Furthermore, a range of values (e.g., W to P, etc.) does not necessarily require the inclusion of intermediate values within the range of values (e.g., W to P can include only W and P, etc.), unless otherwise indicated.

What is claimed is:

1. An aftertreatment system comprising:
    a first leg comprising a first Selective Catalytic Reduction (SCR) system and a first doser;
    a second leg comprising a second SCR system and a second doser; and
    a controller configured to:
        determine satisfaction of one or more enabling conditions;
        in response to the satisfaction of the one or more enabling conditions, dose reductant to the first SCR system using the first doser and to the second SCR system using the second doser;
        determine, in response to the dosing, a first NOx value of the first SCR system based on a reading from a first NOx sensor associated with the first leg, and a second NOx value of the second SCR system based on a reading from a second NOx sensor associated with the second leg;

adjust the dosing of the first SCR system for a first time period in response to the first NOx value and the second NOx value reaching a first predetermined threshold;

at the end of a second time period after adjusting the dosing of the first SCR system, measure a third NOx value of the first SCR system based on the reading from the first NOx sensor, and measure a fourth NOx value of the second SCR system based on the reading from the second NOx sensor;

determine a first difference between the third NOx value and the first NOx value;

determine a second difference between the fourth NOx value and the second NOx value; and generate an indication regarding whether the second NOx sensor is displaced based on the first difference and the second difference.

2. The aftertreatment system of claim 1, wherein the controller is configured to determine that the first NOx sensor and the second NOx sensor are not displaced in response to the first difference being greater than a second predetermined threshold and the second difference being less than the second predetermined threshold.

3. The aftertreatment system of claim 1, wherein the controller is configured to determine that the first NOx sensor and the second NOx sensor are not displaced in response to determining that a difference between the second difference and the first difference is greater than a second predetermined threshold.

4. The aftertreatment system of claim 1, wherein the controller is configured to determine that the second NOx sensor is displaced in response to determining that the first difference is greater than a second predetermined threshold and a difference between the second difference and the first difference is less than a third predetermined threshold.

5. The aftertreatment system of claim 1, wherein the one or more enabling conditions are satisfied in response to a bed temperature of each of the first SCR system and the second SCR system being greater than a second predetermined threshold.

6. The aftertreatment system of claim 1, wherein the one or more enabling conditions are satisfied in response to a engine out NOx value of each of the first leg and the second leg being greater than a second predetermined threshold.

7. The aftertreatment system of claim 1, wherein the first time period is based on a time required for the first NOx value to change by a predetermined percentage.

8. The aftertreatment system of claim 1, wherein subsequent to determining that the first difference is greater than a second predetermined threshold and a difference between the second difference and the first difference is less than a third predetermined threshold, the controller is further configured to:

adjust the dosing of the first SCR system for a third time period;

measure a fifth NOx value of the first SCR system based on the reading from the first NOx sensor, and measure a sixth NOx value of the second SCR system based on the reading from the second NOx sensor after adjusting the dosing of the first SCR for the third time period;

determine a third difference between the fifth NOx value and the first NOx value;

determine a fourth difference between the sixth NOx value and the second NOx value; and generate an indication regarding whether the second NOx sensor is displaced based on the third difference and the fourth difference.

9. A method comprising:

determining, by a controller, satisfaction of one or more enabling conditions;

in response to the satisfaction of the one or more enabling conditions, dosing, by the controller, reductant to a first Selective Catalytic Reduction (SCR) system of a first leg using a first doser and to a second SCR system of a second leg using a second doser;

determining, by the controller in response to the dosing, a first NOx value of the first SCR system based on a reading from a first NOx sensor associated with the first leg, and a second NOx value of the second SCR system based on a reading from a second NOx sensor associated with the second leg;

adjusting, by the controller, the dosing of the first SCR system for a first time period in response to the first NOx value and the second NOx value reaching a first predetermined threshold;

at the end of a second time period after adjusting the dosing of the first SCR system, measuring, by the controller, a third NOx value of the first SCR system based on the reading from the first NOx sensor, and measure a fourth NOx value of the second SCR system based on the reading from the second NOx sensor;

determining, by the controller, a first difference between the third NOx value and the first NOx value;

determining, by the controller, a second difference between the fourth NOx value and the second NOx value; and generating, by the controller, an indication regarding whether the second NOx sensor is displaced based on the first difference and the second difference.

10. The method of claim 9, comprising determining, by the controller, that the first NOx sensor and the second NOx sensor are not displaced in response to the first difference being greater than a second predetermined threshold and the second difference being less than the second predetermined threshold.

11. The method of claim 9, comprising determining, by the controller, that the first NOx sensor and the second NOx sensor are not displaced in response to determining that a difference between the second difference and the first difference is greater than a second predetermined threshold.

12. The method of claim 9, comprising determining, by the controller, that the second NOx sensor is displaced in response to determining that the first difference is greater than a second predetermined threshold and a difference between the second difference and the first difference is less than a third predetermined threshold.

13. The method of claim 9, wherein the one or more enabling conditions are satisfied in response to a bed temperature of each of the first SCR system and the second SCR system being greater than a second predetermined threshold.

14. The method of claim 9, wherein the one or more enabling conditions are satisfied in response to a engine out NOx value of each of the first leg and the second leg being greater than a second predetermined threshold.

15. The method of claim 9, wherein the first time period is based on a time required for the first NOx value to change by a predetermined percentage.

16. A controller comprising:

one or more processors; and one or more memory devices coupled to the one or more processors, the one or more memory devices storing instructions that, when executed by the one or more processors, cause the one or more processors to:

determine satisfaction of one or more enabling conditions;

in response to the satisfaction of the one or more enabling conditions, dose reductant to a first Selective Catalytic Reduction (SCR) system of a first leg using a first doser and to a second SCR system of a second leg using a second doser;

determine, in response to the dosing, a first NOx value of the first SCR system based on a reading from a first NOx sensor associated with the first leg, and a second NOx value of the second SCR system based on a reading from a second NOx sensor associated with the second leg;

adjust the dosing of the first SCR system for a first time period in response to the first NOx value and the second NOx value reaching a first predetermined threshold;

at the end of a second time period after adjusting the dosing of the first SCR system, measure a third NOx value of the first SCR system based on the reading from the first NOx sensor, and measure a fourth NOx value of the second SCR system based on the reading from the second NOx sensor;

determine a first difference between the third NOx value and the first NOx value;

determine a second difference between the fourth NOx value and the second NOx value; and generate an indication regarding whether the second NOx sensor is displaced based on the first difference and the second difference.

17. The controller of claim 16, wherein the instructions, when executed by the one or more processors, cause the one or more processors to determine that the first NOx sensor and the second NOx sensor are not displaced in response to the first difference being greater than a second predetermined threshold and the second difference being less than the second predetermined threshold.

18. The controller of claim 16, wherein the instructions, when executed by the one or more processors, cause the one or more processors to determine that the first NOx sensor and the second NOx sensor are not displaced in response to determining that a difference between the second difference and the first difference is greater than a second predetermined threshold.

19. The controller of claim 16, wherein the instructions, when executed by the one or more processors, cause the one or more processors to determine that the second NOx sensor is displaced in response to determining that the first difference is greater than a second predetermined threshold and a difference between the second difference and the first difference is less than a third predetermined threshold.

20. The controller of claim 16, wherein the one or more enabling conditions are satisfied in response to a bed temperature of each of the first SCR system and the second SCR system being greater than a second predetermined threshold.

* * * * *